US010163298B2

(12) United States Patent
Bytnar et al.

(10) Patent No.: US 10,163,298 B2
(45) Date of Patent: Dec. 25, 2018

(54) WAGERING GAME WEARABLES

(71) Applicant: Bally Gaming, Inc., Las Vegas, NV (US)

(72) Inventors: Michael R. Bytnar, Naperville, IL (US); Michael Vincent DiCillo, Hanover Park-Ontario, IL (US); Patrick M. Gustafson, Chicago, IL (US); Jeremy Michael Hornik, Chicago, IL (US); Gary John Oswald, Elk Grove Village, IL (US); Richard Barry Robbins, Glenview, IL (US); Nickey C. Shin, Chicago, IL (US); Jesse M. Smith, Chicago, IL (US); Simon Edward Sunblade, Valparaiso, IN (US); Jamie W. Vann, Chicago, IL (US); Muthu Velu, Schaumburg, IL (US); Matthew J. Ward, Northbrook, IL (US); Steven J. Zoloto, Highland Park, IL (US); Dale Robert Buchholz, Palatine, IL (US); Mark B. Gagner, West Chicago, IL (US); Craig Joe Sylla, Round Lake, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

(21) Appl. No.: 15/823,824

(22) Filed: Nov. 28, 2017

(65) Prior Publication Data

US 2018/0082524 A1 Mar. 22, 2018

Related U.S. Application Data

(63) Continuation of application No. 14/866,542, filed on Sep. 25, 2015, now Pat. No. 9,858,751.

(Continued)

(51) Int. Cl.
*A63F 13/235* (2014.01)
*G07F 17/32* (2006.01)

(52) U.S. Cl.
CPC ...... *G07F 17/3218* (2013.01); *G07F 17/3209* (2013.01); *G07F 17/3237* (2013.01); *G07F 17/3272* (2013.01); *G07F 17/3286* (2013.01)

(58) Field of Classification Search
CPC ............ G07F 17/3218; G07F 17/3209; G07F 17/3237; G07F 17/3272; G07F 17/3286

(Continued)

(56) References Cited

U.S. PATENT DOCUMENTS 2,477,166 A 7/1949 Berry et al.
5,669,818 A 9/1997 Thorner et al.

(Continued)

OTHER PUBLICATIONS

"Google Glass", Wikipedia, Last modified on May 27, 2014, 8 pages.

(Continued)

*Primary Examiner* — Allen Chan
(74) *Attorney, Agent, or Firm* — David J. Bremer

(57) ABSTRACT

A wagering game system and its operations are described herein. In some embodiments, the operations can include detecting that one or more wearable computers are within a proximity range to a wagering game machine. In some examples, the operations further include determining one or more characteristics associated with the one or more wearable computers in response to the detecting that the one or more wearable computers are within the proximity range to the wagering game machine. In some examples, the operations further include providing a feature associated with a wagering game based on the one or more characteristics of the one or more wearable computers.

20 Claims, 15 Drawing Sheets

Related U.S. Application Data

(60) Provisional application No. 62/078,838, filed on Nov. 12, 2014, provisional application No. 62/056,225, filed on Sep. 26, 2014.

(58) Field of Classification Search
USPC ........................................................ 463/25
See application file for complete search history.

(56) References Cited

U.S. PATENT DOCUMENTS

| | | | |
|---|---|---|---|
| 6,429,846 | B2 | 8/2002 | Rosenberg et al. |
| 6,703,550 | B2 | 3/2004 | Chu |
| 6,906,697 | B2 | 6/2005 | Rosenberg |
| 7,096,852 | B2 | 8/2006 | Gregorio |
| 7,112,737 | B2 | 9/2006 | Ramstein |
| 7,159,008 | B1 | 1/2007 | Wies et al. |
| 7,198,137 | B2 | 4/2007 | Olien |
| 7,245,202 | B2 | 7/2007 | Levin |
| 7,283,120 | B2 | 10/2007 | Grant |
| 7,369,115 | B2 | 5/2008 | Cruz-Hernandez et al. |
| 7,830,361 | B2 | 11/2010 | Muraki |
| 7,864,164 | B2 | 1/2011 | Cunningham et al. |
| 8,098,234 | B2 | 1/2012 | Lacroix et al. |
| 8,157,650 | B2 | 4/2012 | Grant et al. |
| 8,210,942 | B2 | 7/2012 | Shimabukuro et al. |
| 8,360,847 | B2 | 1/2013 | Williams et al. |
| 8,485,906 | B2 | 7/2013 | Walker et al. |
| 8,500,534 | B2 | 8/2013 | Rasmussen et al. |
| 8,624,857 | B2 | 1/2014 | Cheung et al. |
| 8,678,923 | B2 | 3/2014 | Radek et al. |
| 8,686,839 | B2 | 4/2014 | Posamentier |
| 8,721,416 | B2 | 5/2014 | Grant et al. |
| 8,992,318 | B2 | 3/2015 | Hightower |
| 9,117,340 | B2 | 8/2015 | Popovich et al. |
| 2002/0033795 | A1 | 3/2002 | Shahoian et al. |
| 2003/0054881 | A1 | 3/2003 | Hedrick et al. |
| 2004/0189484 | A1 | 9/2004 | Li |
| 2004/0192260 | A1 | 9/2004 | Sugimoto et al. |
| 2005/0153768 | A1 | 7/2005 | Paulsen |
| 2005/0248549 | A1 | 11/2005 | Dietz et al. |
| 2006/0066569 | A1 | 3/2006 | Eid et al. |
| 2006/0256075 | A1 | 11/2006 | Anastas et al. |
| 2007/0063849 | A1 | 3/2007 | Rosella et al. |
| 2007/0259716 | A1 | 11/2007 | Malice et al. |
| 2008/0068334 | A1 | 3/2008 | Olien et al. |
| 2008/0084384 | A1 | 4/2008 | Gregorio et al. |
| 2008/0120029 | A1 | 5/2008 | Zelek et al. |
| 2008/0132313 | A1 | 6/2008 | Rasmussen et al. |
| 2008/0287182 | A1 | 11/2008 | Aida |
| 2009/0002328 | A1 | 1/2009 | Ullrich et al. |
| 2009/0124376 | A1 | 5/2009 | Kelly et al. |
| 2009/0326406 | A1 | 12/2009 | Tan et al. |
| 2012/0184367 | A1 | 7/2012 | Parrott et al. |
| 2012/0302302 | A1 | 11/2012 | Hamlin et al. |
| 2012/0302323 | A1 | 11/2012 | Gagner et al. |
| 2012/0319827 | A1 | 12/2012 | Pance et al. |
| 2013/0296053 | A1 | 11/2013 | Rasmussen et al. |
| 2013/0311881 | A1 | 11/2013 | Bimbaum et al. |
| 2014/0073409 | A1 | 3/2014 | Lesley et al. |
| 2014/0087867 | A1 | 3/2014 | Hightower |
| 2014/0218184 | A1 | 8/2014 | Grant et al. |
| 2014/0266647 | A1 | 9/2014 | Visitacion et al. |

OTHER PUBLICATIONS

"Li-Fi", Wikipedia, Last Date Modified: Aug. 13, 2014, 15 pages.
"Samsung Gear 2", Wikipedia, Last modified on May 17, 2014, 3 pages.
"Smartwatch", Wikipedia, Last modified on May 21, 2014, 5 pages.
"Visible Light Communication", Wikipedia, Last Date Modified: Aug. 8, 2014, 12 pages.
Hass, "Wireless Data from Every Light Bulb", TEDGlobal 2011, Jul. 2011, 10 pages.

WAGERING GAME WEARABLES

RELATED APPLICATIONS

This application is a continuation of U.S. patent application Ser. No. 14/866,542 which was filed Sep. 25, 2015 and which claims the priority benefit of U.S. Provisional Application Ser. No. 62/056,225 filed Sep. 26, 2014 and U.S. Provisional Application Ser. No. 62/078,838 filed Nov. 12, 2014, each of which is incorporated herein by reference in their respective entireties.

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2017, Bally Gaming, Inc.

TECHNICAL FIELD

Embodiments of the inventive subject matter relate generally to wagering game systems and networks that, more particularly, use wagering game wearables.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaining enhancements that will attract frequent play.

BRIEF DESCRIPTION OF THE DRAWING(S)

Embodiments are illustrated in the Figures of the accompanying drawings in which.

DESCRIPTION OF ILLUSTRATIVE EMBODIMENTS

Figure 1:
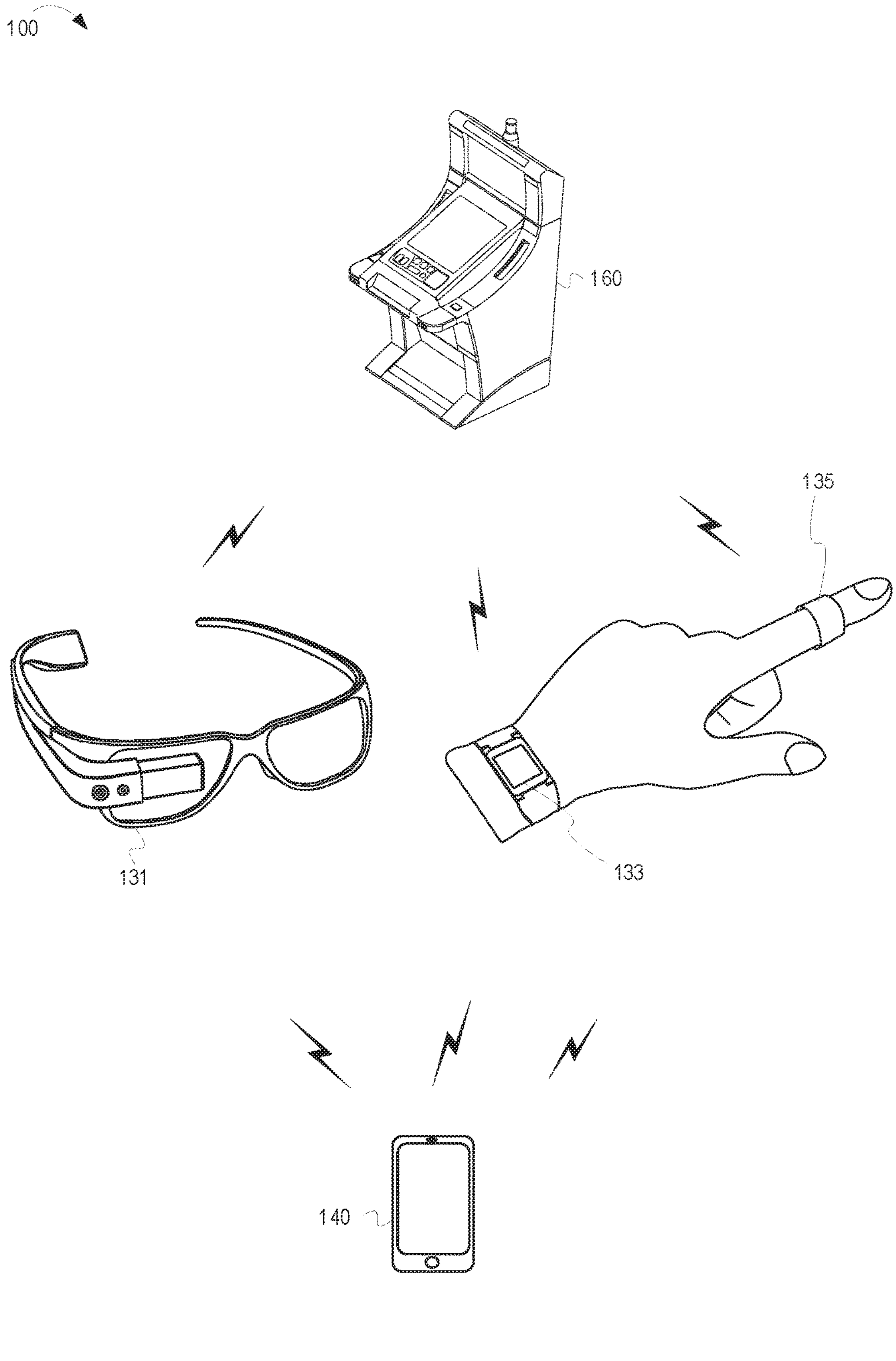
FIG. 1 is an illustration of using wagering game wearables, according to some embodiments.

This description of the embodiments is divided into five sections. The first section provides an introduction to embodiments. The second section describes example embodiments while the third section describes example operations performed by some embodiments. The fourth section describes example operating environments while the fifth section presents some general comments.

For purposes of the present detailed description, a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

Furthermore, for purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or online casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Further, some embodiments of the inventive subject matter describe examples of wagering game wearables in a network wagering venue (e.g., an online casino, a wagering game website, a wagering network, etc.) using a communication network. Embodiments can be presented over any type of communications network that provides access to wagering games, such as a public network (e.g., a public wide-area-network, such as the Internet), a private network (e.g., a private local-area-network gaming network), a peer-to-peer network, a social network, etc., or any combination of networks. Multiple users can be connected to the networks via computing devices. The multiple users can have accounts that utilize specific services, such as account-based wagering services (e.g., account-based wagering game websites, account-based casino networks, etc.).

Introduction

This section provides an introduction to some embodiments.

Wagering games are expanding in popularity. Wagering game enthusiasts expect continuous innovations to the wagering game experience. As stated previously, wagering game companies are interested in creating and providing innovative wagering games and gaming features to the demanding public. Wearables computers ("wearables") are becoming more mainstream. Wagering game manufactures, casinos, and customers alike would all benefit from innovations for wagering game wearables.

FIG. 1 is a conceptual diagram that illustrates an example of using wagering game wearables, according to some embodiments. In FIG. 1, a wagering game system ("system 100") includes a wagering game machine 160, wearables 131, 133, and 135, and a mobile device 140. Wearables 131, 133, and 135 are examples of wearable computers, also known as body-borne computers. Wearables are miniature electronic devices that are worn by the bearer under, with or on top of clothing. Wearables can be consistently powered on and enable a constant interaction between the wearer and electronic technology in the wearable. Wearables can be passive. For instance, a wearable can function primarily as a sensing device with minimal presentation capabilities, and requiring minimal user interaction. In many cases, a wearable can interact with a more powerful computing device, such as a smartphone or other mobile device (e.g. mobile device 140). In some cases, there can be a periodic communication between a wearable and the more powerful computing device. In some examples, the more power computing device accompanies the wearer, though the more power computing device may not necessarily be worn on the body. For example, mobile devices tend to be much larger than wearables, and thus spend much of their time in a user's pocket, in a purse, or in some other place that is not readily viewable or accessible. In some examples, the mobile device can include mobile applications (apps) which coordinate with the wearable.

Some examples of wearables include computer watches, electronic glasses, electronic jewelry (e.g., necklaces, rings, etc.), tattoos with electronic elements, clothing with electronic components, electronic contact lenses, etc. Some examples of current wearables include the FitBit® device produced by FitBit Inc., the Apple Watch device produced by Apple Inc., the Glass device produced by Google Inc., shoe wearables by Nike Inc., and tracking watches and fitness wristbands by Garmin Ltd.

Some examples of the inventive subject matter describe examples of wagering game wearables (e.g., wearables 131, 133, and 135), that can interact with gaming devices (e.g., wagering game machine 160, wagering game servers, etc.), mobile devices (e.g. mobile device 140), and each other. In some examples, the system 100 provides gaming features based on the wearables 131, 133, and 135. In some examples, the system 100 provides wagering game event data to one or more of the wearables 131, 133, and 135, such as via imperceptible signals. The system 100 can track the wagering game event data and, via one or more of the wearables 131, 133, or 135, transport the wagering game event data between casino locations. In some examples, the system 100 causes wagering game activities based on analysis of biometric signals from one or more of the wearables 131, 133, and 135. In some examples, the system 100 activates a feature of the wagering game machine 160 via use of one or more of the wearables 131, 133, and 135.

Although FIG. 1 describes some embodiments, the following sections describe many other features and embodiments.

Example Embodiments

This section describes some example embodiments.

Providing Gaming Features Based on Wearables

The following sub-section describes examples of providing gaming features based on wearables.

Providing a Game Feature Using a Wearable.

In some embodiments, a wagering game system ("system") is configured to present gaming content or gaming information via wearable such as, but not limited to, the following examples.

Figure 2A:
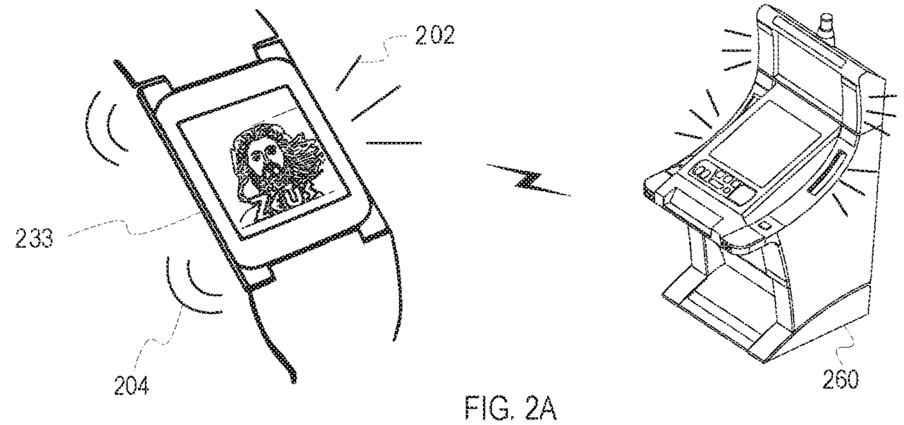
FIGS. 2A and 2B are illustrations of providing gaming features using wagering game wearables, according to some embodiments.

- In some embodiments, the system can use a wearable to present game play and game content. For instance, the system can cause a wearable to display certain meters from a wagering game (e.g., bet meters, credit meters, luck meters, etc.). In other examples, the system can cause a wearable to display wins of the wagering game, progressive game values, congratulatory messages, game instructions, etc. In yet other examples, the wearable can include Bluetooth headphones, which can receive audio output from a wagering game machine and present the audio via the headphones. In some embodiments, the system causes the wearable to present an extra game element (e.g., an extra reel, a bonus symbol, etc.). FIG. 2A illustrates an example. In FIG. 2A, a wagering game machine 260 communicates with a wearable 233. The wagering game machine 260 presents slot reels for a specific slot game (e.g., the ZEUS slot game by WMS Gaming Inc.). The slot game may have a certain number of reels and symbols per reel. The wagering game machine 260 detects the presence of the wearable 233 and, as part of the game experience, provides an additional symbol to the wearable 233. The player associated with the wearable 233 can then use the symbol in certain circumstances (e.g., in a bonus game). In some examples, the wagering game machine 260 may select a certain reel from those presented via the wagering game machine 260 and leave one of the symbols blank on the reels. After the reels stop spinning, the wagering game machine 260 can present the missing reel symbol on the wearable 233. The player can then tap the wearable 233 to cause the symbol to appear to transfer from the wearable 233 to the location of the missing symbol on the reel.

In some embodiments, a wearable can interact with a wagering game machine for gaming purposes. For example, the wagering game machine can detect movements by the wearable and use the input as playing controls. The wagering game machine can detect the wearable based on a color or specific lighting of the wearable. For example, in FIG. 2A, the wearable 233 can generate a specific color (e.g., glow 202). The wagering game machine 260 can detect the specific color and luminosity of the glow 202. The wagering game machine 260 tracks the movement of the wearable 233 based on the location of the glow. The wagering game machine 260 can use the data regarding the location of the glow as input for a wagering game. For instance, the wagering game machine 260 can present (e.g., via the display of the wagering game machine 260 or via a visual display in a viewer wearable) a depiction of a virtual lever used to spin the slot reels. The wagering game machine 260 can then indicate for the player to make a pulling motion, as if pulling an actual slot lever. The wagering game machine 260 can detect the motion of the player based on the location and movement of the wearable 233 based on the glow 202. Based on the movement of the wearable 233, the wagering game machine 260 can then cause the reels to spin. As a security measure, the wagering game machine 260 can cause the intensity, color, or other visual characteristics of the glow 202 to change or fluctuate based on each spin, thus distinguishing the wearable 233 with other wearables that may be in the field of visual detection of the wagering game machine 260.

In some embodiments, the system causes a wearable to present accompanying game play information. For example, the system can provide an intelligent alert system that pushes out notifications from a wagering game machine to the wearable. The notifications can be used by the wearable to present content or an accompanying effect in synchronicity with, or substantially concurrent with, presentation of the wagering game content via a wagering game machine. For example, the wearable can present a haptic response (e.g., vibrations, taps, buzzes, etc.) to certain wagering game events, actions, outcomes etc. of the wagering game. The wearable can include a gyroscope to generate the haptic responses. For example, in FIG. 2A, a wagering game associated with wagering game machine 260 may include a certain rhythm to the spinning of reels as the slot reels speed up and slow down. For instance, as reels spin on the display of the wagering game machine 260, the wearable 233 can produce a tapping or spinning rhythm 204 that appears to match the acceleration and deceleration of the slot reels.

In some embodiments, the system causes a wearable to anticipate a gaming event in a wagering game. For instance, a wagering game may be configured to present a bonus game in response to a certain wagering game outcome. The wagering game is configured to present the bonus game after the game outcome is presented, for example when the reels of a slot game have stopped spinning and a reel-stop configuration is presented, which that reveals the game outcome that triggers the bonus. However, in some embodiments, the wagering game machine can secretly communicate to the wearable that a bonus game will follow the reveal of the game outcome for a game round that is in progress. The wearable detects the secret communication from the wagering game about the eventual appearance of the bonus game. In response to detecting the eventual appearance of the bonus game, the wearable can begin to glow or vibrate. Thus, the wearable can provide the impression that the wearable is a part of the wagering game. Further, because the wearable can present an indication of something desirable that will occur at a future time, the wearable can give the appearance of being a luck detector.

In some embodiments, the system causes a wearable to present an accompanying wagering game feature after a game play round has passed. For example, a wearable can be configured to have a win halo effect. For instance, the wearable can glow for a given time period after a win occurs in a wagering game, including glowing in subsequent game play rounds. The glow can decay, or taper out, in intensity over multiple playing rounds.

In some embodiments, the wearable can be configured with player preferences to indicate what to present after certain game events (e.g., how long a wearable should present a haptic response, how long a wearable should glow, what congratulatory effect the wearable should indicate, etc.).

In some embodiments, the system can provide a wagering game that is played only on, or primarily presented on, a wearable. One example includes a coin-toss game presented on a wearable. The wearable may interact with a wagering game machine and/or a wagering game server for some aspects of the game, such as signup, random number generation, player account communications, etc.

In some embodiments, wearable can be used to interact with wagering game machines for security purposes. For example, in FIG. 2B, a wearable 231 projects information onto a hand of the player. In some examples, the information that is projected can be a login pin or code. In other examples, the projected code can involve a secondary authentication factor, such as a proximity to a wearable on the player's hand or arm. For example, in FIG. 2B, the wearable 231 communicates with a wagering game machine. The wagering game machine causes the wearable 231 to present a message 205 that to login to the wagering game machine, the player must move a projected code 277 over the wearable 233 on the player's wrist. The message 205 further indicates that the player can provide an additional input to verify the login procedure (e.g., to tap the wearable 233).

In some embodiments, the wearable may function as a player card. For example, the wearable may have a coded identifier presented on it, or may transmit an identifier signal that identifies a player's account based wagering account or a loyalty program account. The wearable can be used to login to, logout of, cash in at, cash out from, or perform other activities associated with, a wagering game machine.

Figure 2B:
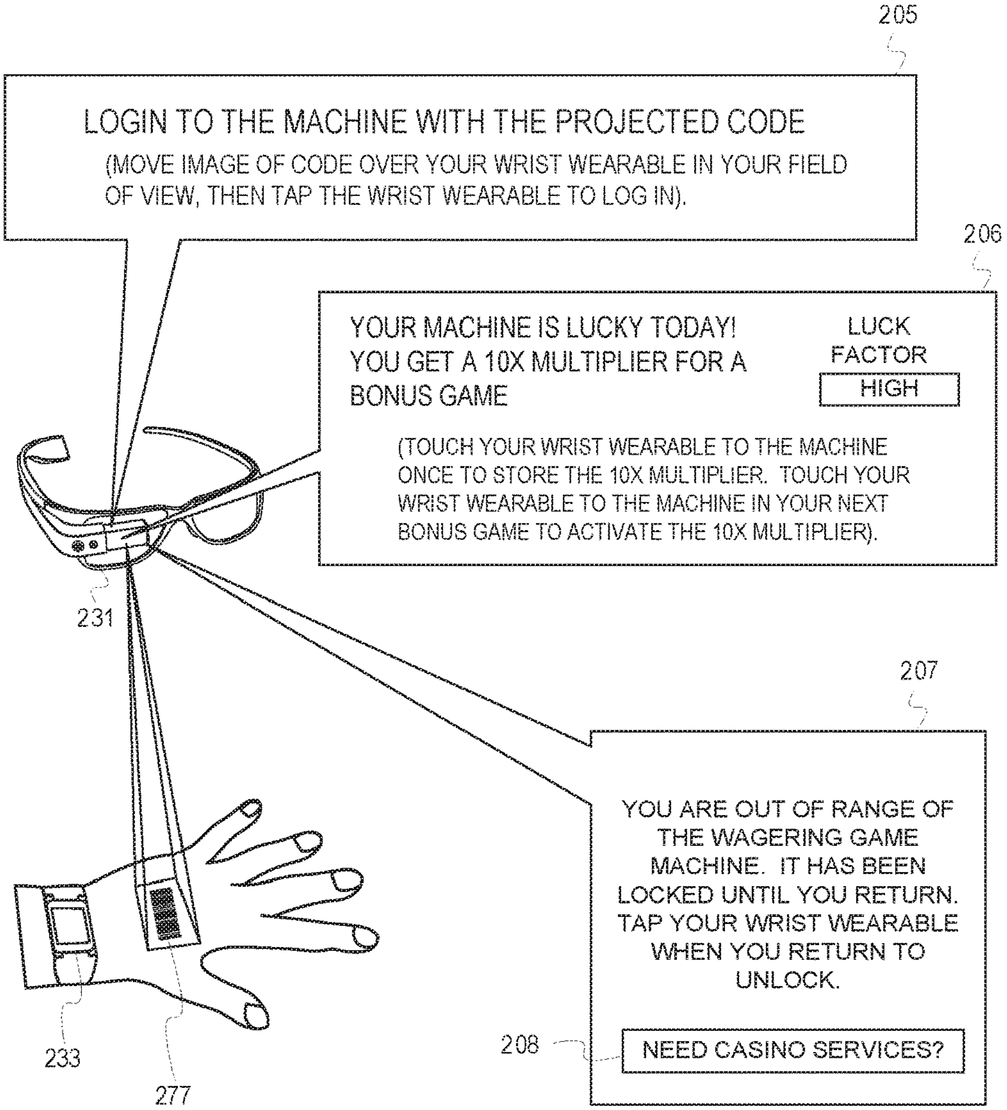

In some embodiments, the system can perform a security feature, such as an automatic cash-out, locking a wagering game machine, etc. based on a characteristic of a wearable, location of the wearable, use the wearable, etc. For example, a wagering game machine can detect when a wearable leaves a given proximity range and then lock the wagering game machine. In some embodiments, the wagering game machine can also detect when a wearable is no longer located at, or touching, a certain area of the wagering game machine. For instance, in a player's wrist wearable may be touching, or in near proximity (e.g., within a few centimeters) to a button panel of the wagering game machine or on an arm rest of the chair of the wagering game machine. When the wearable breaks the contact, or leaves the near proximity, the wagering game machine can lock. In some examples, the wearable may not be directly touching the machine, but a part of the player may be touching the machine (e.g., a part of the player's skin is touching some part of the wagering game machine). The wagering game machine can transmit a low level energy signal that travels through an electrical conductance of the player's skin to the wearable. Thus, the wagering game machine can detect when a player is in contact with the wagering game machine, and/or communicate data with the wearable via the contact. In FIG. 2B, a message 207 appears when one or more of the wearable 231 or 233 leave a proximity range to a wagering game machine or a portion of the wagering game machine. The message 207 indicates that the wagering game machine has been locked. Upon return to the wagering game machine, the player can tap the wearable 233 to the wagering game machine to unlock the wagering game machine.

In some embodiments, the system can cash-in a ticket only if the ticket has an identifier associated with the wearable (i.e., a code on the ticket is linked to a code stored on the wearable). In some examples, a cash-out ticket also has a coded identifier tied to the wearable. Thus, only a player with the particular wearable can cash the ticket.

In some embodiments, the system causes a wearable to provide game tracking and assistance features. For instance, the wearable can track wagering game events. The wearable can further track a player's activities in the wagering game. Based on one or more of the wagering game events and/or the player's activities in the wagering game, the wearable can make suggestions about game play. For example, the wearable can make suggestions about how to improve blackjack play. In another example, the wearable can make a suggestion about how to optimize play in a slot game. In yet another example, the wearable can provide explanations of game rules and mechanics. In yet another example, the wearable can offer casino information, such as casino services. For example, in FIG. 2B, the wearable 231 detects that the player has left a wagering game machine in the middle of a wagering game session. Based on the context of the situation (e.g., the player left in the middle of the gaming session), the wearable 231 then presents an option 208 related to the context (e.g., the wearable 231 determines that the player may want to know about casino services, maps, etc.).

In some embodiments, a wearable can indicate data related to a luck factor. For example, the wearable can detect a player identifier from a wearable, access a player history (e.g., stored on the wearable, accessible via a local player account, etc.), and review the player history for factors that may indicate luck or a luck relationship, such as a degree of winnings with a particular wagering game machine. Based on the factors the wearable can specify to the player, via a wearable, whether a machine is luck. In other examples, system may notify a player, via a wearable, about a lucky machine or game. In FIG. 2B, for instance, a wagering game machine causes the wearable 231 to present a message 206 which specifies that the wagering game machine is lucky (e.g., a luck factor is "high"). The system may determine the degree of luck based on the player history and/or luck related factors. The system can further determine luck based on a value of an award that a casino wishes to provide to the player, such as a 10X multiplier for a bonus game.

In some embodiments, a wearable can have a modifier added to it (e.g., a bonus multiplier, a luck modifier, etc.). Based on the modifier, when the wearable approaches a wagering game machine, the wagering game machine can enable a certain set of features, a different set of pay tables, etc. For example, in FIG. 2B, the message 206 specifies that the 10X multiplier is stored in the wearable 233. The player then needs to touch the wearable 233, or interact with the wearable 233 in a certain way, to cause the 10X multiplier to transfer to the wagering game machine.

In some embodiments, the system can associate a wearable to a preference for a player. For example, the system can associate a wearable to a favorite button, game, or other feature of a wagering game machine. For examples, a ring type of wearable may be linked to the "spin" control of a slot game. When the player taps the finger that the ring wearable is on, a spin operation may initiate. In some embodiments, for a multi-game machine, the system can associated a favorite wagering game title or theme to a wearable. Thus, when a player arrives at the wagering game machine, the wagering game machine can detect, from the wearable, the setting related to the favorite game. The favorite game can then be automatically selected and loaded for play. Preference settings can relate to all aspects of a wagering game session, such as volume settings, chair settings, social communication settings, bet levels, etc.

In some embodiments, a wagering game machine can respond the locality of a wearable by causing the wearable to light up, vibrate, make a pleasant sound, etc. when the player walks by, or brings the wearable to within a proximity range to the wagering game machine.

In some embodiments, a wagering game machine can send a message to a wearable that wagering game machine need a response from player. For example, the wagering game machine may detect that the player has not completed their game activities in a bonus game. Thus, the wagering game machine causes a wearable to indicate the need to complete the game activities. In another example, the system may require a verification (e.g., to a cash-out procedure, to a spin operation, etc.), and may indicate, via the wearable, information related to the verification.

In some embodiments, the system can detect that when the wearable perform a specific action or comes into proximity with a certain portion of a wagering game machine and then present a response that appears as if the player has discovered a new or hidden feature of the wagering game or wagering game machine. For example, a wagering game machine may detect (e.g., using Li-Fi™ technology), that a wearable moves in front of the display with a certain motion (e.g., a player moves a ring wearable over a portion of the reels after a certain symbol appears). The ring wearable then begins to vibrate. A wrist wearable may also begin to glow. An eye wearable may also indicate a visual indicator at the location of the portion of the reels (e.g., an after effect glow). An ear wearable may play a certain noise or sound effect (e.g., a twinkling or sparkling sound effect). An olfactory wearable may present a certain scent (e.g., a sweet smelling scent). All of the visual, auditory, olfactory, and tactile effects appear to indicate that a secret feature is discovered. The wearable can store a history of the player's actions to recreate the response of the hidden feature at a later time, at a different machine, etc.

In some embodiments, the system detects contextual information about a location, characteristic, power level, orientation, etc. of a wearable. Based on the contextual information, the system determines actions of a player. The wearable can then customize a game experience to the context.

In some embodiments, the system can provide a wagering game that is stored on a wearable. The wagering game can travel with the player to different locations.

In some embodiments, a wearable can produce alerts or notifications when a casino employee is in close proximity.

In some embodiments, the wearable can provide a notification when a player is close to a "hot" slot game (e.g., the player is in close physical proximity to a wagering game machine that has paid out above average over a recent time period). The wearable can produce and/or detect differing signals (e.g., different frequencies, power levels, etc.) for differing levels of physical proximity.

In some embodiments, the system can detect that a player has wearable and can offer specific game content, prizes, features, etc. that the player would not receive if the player did not have a wearable. For example, in some embodiments, the system offers a mystery prize for people with wearables (e.g., the system offers a mystery prize to one of a group of individuals in a casino that have wearables). The mystery prize can be tied to specific gaming activity or conditions. For instance, at a certain time of day, the system can generate a mystery prize for the first person with a wearable that hits a certain coin-in threshold. In another example, the system can provide a portion of a large jackpot, when it hits at one wagering game machine, to some, or all, individuals wearing a wearable who are playing at other wagering game machines. In yet another example, the system can enable side bets or other gaming features to those who have wearables.

Providing Social Game Features Based on Wearables.

In some embodiments, a wagering game system ("system") is configured to provide social game features based on wearables, such as, but not limited to, the following examples.

Figure 3:
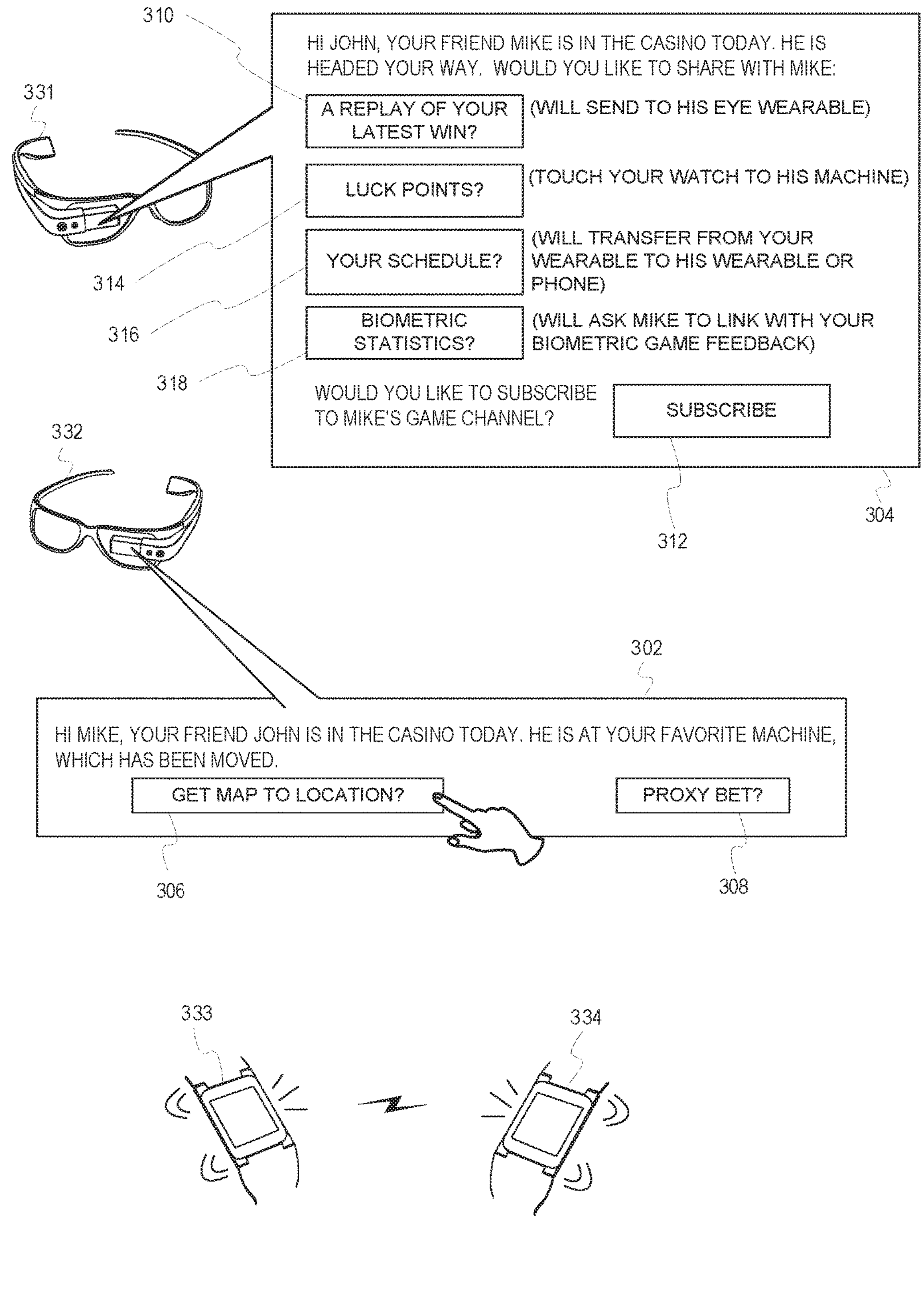
FIG. 3 is an illustration of providing social gaming features using wagering game wearables, according to some embodiments.

In some embodiments, the system can notify a player, via a wearable, when other players (e.g. friends), who also have wearables, are at a casino. FIG. 3 illustrates an example. In FIG. 3 a first wearable (i.e., wearable 332) is presented a message 302 that indicates that a first patron (e.g., "Your friend John"), is at a casino. Likewise, a second wearable (i.e., wearable 331) specifies, via a message 304, that second patron (e.g., "Your friend Mike" is also at the casino.

In some embodiments, the system also provides a feature to find a person in a casino who is wearing a wearable. For example, in FIG. 3, the message 302 provides an option 306 to be shown, via the wearable 332, a map to a location of a person (e.g., to John's location). The message 302 can also provide the location of a particular wagering game machine. Sometimes operators can move a wagering game machine to a different location on a casino floor. The information provided via message 302 can be very helpful to a patron that prefers a particular machine, yet does not know about the machine having been moved.

In some embodiments, the system can offer betting options to a player related to social contacts. For example, in FIG. 3, the wearable 332 provides an option 308 to proxy bet through a social contact at the casino. Proxy betting involves placement of a bet on a person's behalf. The wearable 332 can provide the option whether the player is in the casino or not in the casino. For example, the player can proxy bet through a friend at a casino even when the payer is not at the casino. The wearable 332 can provide a proxy betting interface through which the player can specify amounts to bet, when to bet, a winning percentage commission to give to the friend, etc. In some examples, the proxy bet winnings or wagers can be taken from, or added to, a player account funds balance.

In some embodiments, the system can specify gaming information about a social contact. For example, in FIG. 3, the wearable 331 presents, via the message 304, an option 310 by which the player (i.e., John) can send a replay of his gaming results for view by his friend (i.e., Mike) via the wearable 332. In another example, the wearable 331 presents an option to subscribe to a channel (e.g., news feed) regarding Mike's activity in the casino, his game data, his game results, etc. In some embodiments, the system can also connect to a social-network user account associated with the wearable. For example, in FIG. 3, the wearable 331 may be a Google Glass wearable, which is tied in directly to a Google+ account for John. The wearable 331 can detect an identity of the wearer using biometric data, such as facial recognition. The wearable 331, thus, can determine an identity for John, log into his (Google+ account, and determine information about his social contacts (e.g., information about Mike).

In some embodiments, the system can provide an option to share game data, features, options, social benefits, secondary game benefits, status points, assistance to advance in a game, etc. by direct interaction between a wearable and another wearable or a wagering game machine associated with a wearable. For example, in FIG. 3, the wearable 331 provides an option 314 by which John can share luck points with Mike by, in part, touching a wearable 333 (belonging to John) to a wagering game machine that Mike is playing. In another example, John can instead touch the wearable 333 to a wearable 334 belonging to Mike.

In some embodiments, the system can provide an option to share schedule data, such as vacation plans, dinner plans, etc. (e.g., see option 316 in FIG. 3).

In some embodiments, the system can provide an option to share biometric data with another friend, and in turn, to receive their biometric data (see option 318 in FIG. 3).

In some embodiments, wearables can indicate when one casino patron is in close proximity to a social contact. For example, in FIG. 3, when the wearable 333 comes into close proximity to wearable 334, both the wearable 333 and the wearable 334 begin to glow and vibrate.

In some embodiments, the system can detect that a player is winning and then cause a friend's wagering game machine, and other neighboring machines in the area, to send signals to wearables. Thus, the system can cause a winning effect to radiate, via wearables, from a hot machine.

In some embodiments, the system provides an option for a player to pick a position at a gaming table and place bets, via a wearable, at the gaming table, place side-bet for games presented at the table, and so forth, without involving a dealer.

Providing Joint Wagering Game Play Via Wearables.

In some embodiments, a wagering game system ("system") is configured to provide joint wagering game play via wearables, such as, but not limited to, the following examples.

In some embodiments, the system can provide a joint, or community wagering game. The system can further provide a feature where players with wearables can share wins proportionally to the amount of funds (e.g., coin in) provided by each of the players.

In some embodiments, the system can provide a wagering game where combinations of different types of wearables can unlock different game options, content, features, etc. For example, a player with a wearable of a first type (e.g. an eye wearable) can view or see certain things in a game that other players may not. That player can team up with a player who has an ear wearable to hear certain sounds, with a player who has a wrist wearable to receive vibrations or visual indicators (e.g., glow) regarding certain game elements, etc. In some examples, some types of wearables are eligible to cause occurrence of better bonus symbols, some types can provide extended play, etc. If all of the players play as a team, they have a better chance of winning the game, obtaining game accomplishments, etc. In some embodiments, one player can send a message to other players who have certain types of wearables, to join a game. In some examples, when multiple players have different types of wearables, the combination of the wearables can unlock a given game feature, present certain content, cause a tournament to start, etc. In some examples, some types of wearables may only be active for the game feature for a given time.

In some embodiments, the system can provide a community wagering game that is playable only using wearables, without the need for a wagering game machine to present wagering game content. One example is a hot-potato game where a group of wearables light up. Each person can bet on which wearable will be the last to be lit. One of the wearables can be a lead device to gather together the group of players, enter the bets, and initiate the game. When the game is initiated, the light on each of the wearables turns off randomly one by one until only one wearable remains lit. The last wearable to remain lit is the winner. In some embodiments, the wearables can sense each other, such as via a low-energy wireless communication protocol (e.g., the Bluetooth® communication technology). In some embodiments, the communication range can be set to be limited range (e.g., within a range of 10 to 34 feet). In some embodiments, a wagering game machine and/or wagering game server can controls various aspects of the game, such as the random number generation, player account communications, game signup, etc.

Tacking and Using Gamin History Via Wearables

The following sub-section describes examples of tracking and using gaming history via wearables. In some embodiments, a wagering game system ("system") is configured to track and use gaming history via wearables, such as, but not limited to, the following examples.

Figure 4:
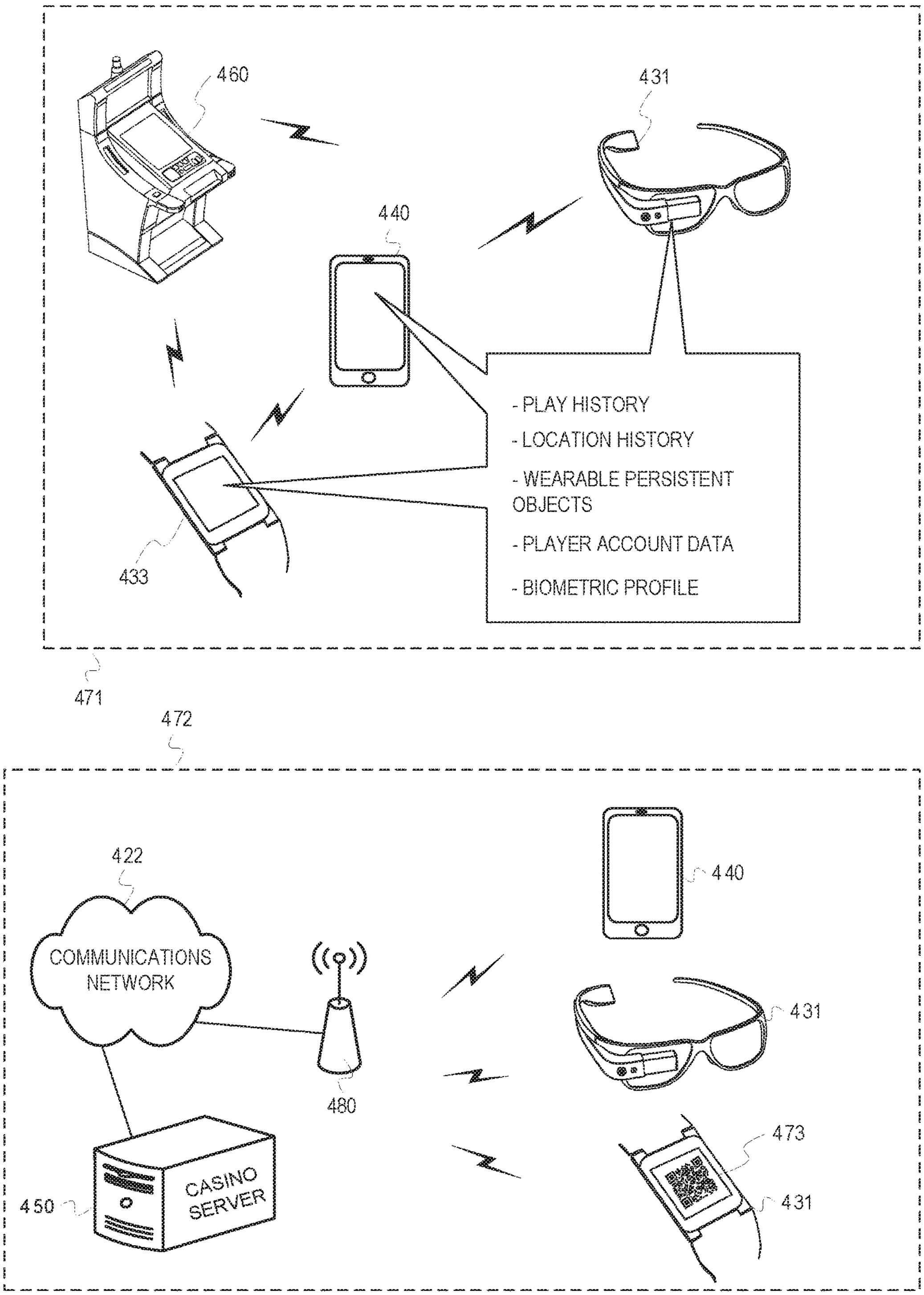
FIG. 4 is an illustration of providing wagering game event data via imperceptible signals, according to some embodiments.

In some embodiments, the system tracks a player's game-related history using a wearable. In some examples, the game-related history is stored on the player's wearable, or in a mobile device that is in communication with the wearable. In some examples, the game-related data includes, but is not limited to, game play data, location data (e.g., within a casino, near a casino, outside a casino, etc.), achievements in wagering games, purchases associated with wagering games, modifications and persistent objects provided by a wagering game, social interactions with other players, biometric data that occurs to the player while gaming, a biometric profile of a player, a player profile, player identification, electronic funds, persistent-state games, game progress, a barcode or other machine-detectable identifier of the wearable, etc. The wearable, and accompanying mobile device, travels with the player between casinos. The wearable and/or the mobile device pass the game-related data to a casino when the devices enter the casino. In some examples, the wearable and/or mobile device can upload data to a player account, online account, etc. In some embodiments, the game-related data may be stored temporarily on the wearable during a game session. Later, the game-related data may be synched with the mobile device and/or player account stored. FIG. 4 illustrates an example. In FIG. 4, wearables 431 and 433 receive game-related data from a wagering game machine 460, or other casino devices, in a first casino 440. In some examples, the wearables 431 and 433 communicate the game-related data to a mobile device 440. Later, the wearables 431 and 433, and the mobile device 440, enter a second casino 472. The wearables 431 and 433, as well as the mobile device 440, can communicate information to a casino server 450 via a wireless access point 480 and a communications network 422. In some embodiments, the casino server 450 can detect an identifier for one or more of the wearables 431 and 433 and then access a user account that may include game-related data. In some embodiments, the casino server 450 can pass a summary of the game-related information to the wearable 431 and/or wearable 433.

In some embodiments, a casino can provide one or more wearables to casino patrons to wear while at the casino.

The casino-provided wearables may be configured to only communicate with casino devices and not with other personal devices (e.g., not with the player's smartphone). In some embodiments, the wearable can work at various locations in the casino property, such as on the casino floor, in the hotel rooms, at venues in a casino, in a pool area of the casino, etc. In some embodiments, the casino wearable is waterproof (e.g., for pool parties at the casino property). The wearable can provide options to perform wagering activities in any of the areas of the casino property.

In some embodiments, a casino can provide an option to register a personal wearable for use in a casino. The wearable can link with casino systems. The casino system can assign each wearable a unique identifier for use in the casino. In some embodiments, the unique identifier can be tied to a player account for the particular casino. In some embodiments, the wearable can present a registered code (e.g., a pin, a QR code, etc.) for the particular casino to scan or enter when the wearable arrives at the casino (e.g., QR code 473 shown in FIG. 4). The code can also authenticate the player with a player account.

In some embodiments, a wagering game machine can detect, from a wearable, whether the player has played the wagering game machine and/or the wagering game associated with the wagering game machine. If the player has not played the wagering game or used the wagering game machine, the wagering game machine can cause the wearable to present information (e.g., how to play the game, how to use the machine, etc.). In other examples, if the wagering game machine detects, from the game-related data on the wearable, that the player has played the wagering game and/or used the wagering game machine, the wagering game machine can cause the wearable to present some player history on the wearable and/or on the wagering game machine.

Figure 5:
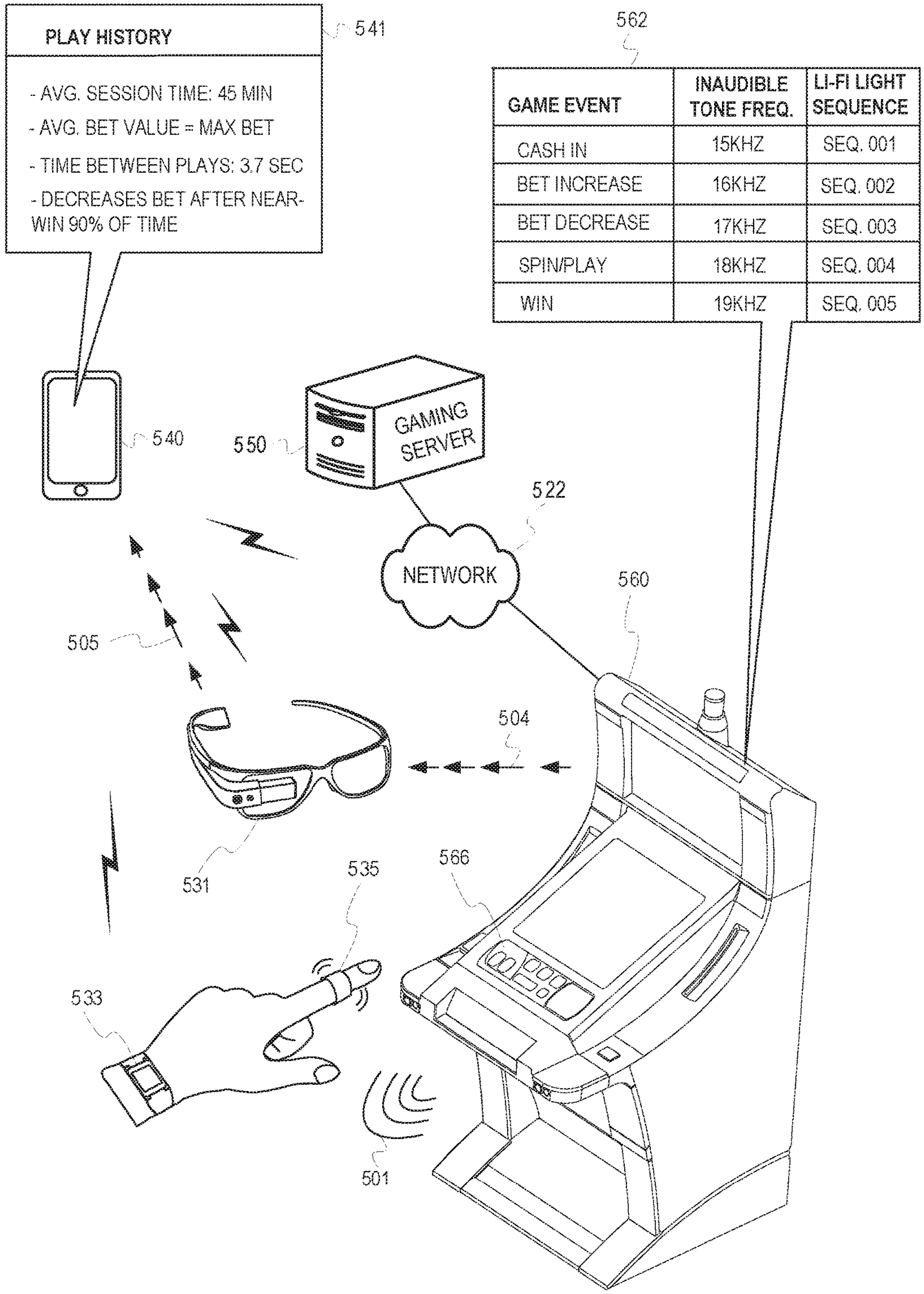
FIG. 5 is an illustration of transporting wagering game event data between casino locations via wagering game wearables, according to some embodiments.

In some embodiments, a wearable is configured to detect visible, auditory, and haptic signals that are not detectable by human perception. FIG. 5 illustrates an example of detecting non-perceptible signals via a wearable. In FIG. 5, an inaudible tone 501 is emitted from a wagering game machine 560 (e.g., tones that are imperceptible by the human ear, such as infrasonic and ultrasonic frequencies). The tones can indicate certain game events that occur in a wagering game presented by the wagering game machine 560. For example, when a game event occurs, the wagering game machine 560 looks up a specific tone to present from a database 562 of tone frequencies that correspond to the wagering game events. For example the events may be cash-in, bet increases, bet decreases, amounts of bets, wins, spin completions, etc. In some embodiments, the sounds of the tones are beyond a range of human perception, such as frequencies that are above or below the range of frequencies that are perceptible by human hearing (e.g., frequencies beyond the range of 20 hertz to 20 kilohertz. In some embodiments, the system utilizes tones that are approximately 14 kilohertz or above. Tones that are approximately 14 kilohertz or above can be directed more easily than tones in a lower frequency range. By directing tones, the wagering game machine 560 can ensure that the tones are detectable by only wearables associated a player at the wagering game machine 560. Thus, wearables by a player at a neighboring wagering game machine would not detect and record the tones from the wagering game machine 560. In some embodiments, the system can detect a range of hearing by a particular user and modify the tones to be outside that range. For example, most people over 40 years old cannot hear tones that are approximately 14 kiiohertz or above. However, some people might, such as people younger than 40 years old, or individuals over 40 who can still detect the frequencies from about 14 kilohertz to about 20 kilohertz. The system can detect, via biometric feedback of wearables, by reading a player profile, etc., an age of the player and/or whether the player can hear the tones. If the system detects that the player can hear the tones, the system can shift the range of frequencies to be higher. In some embodiments, the speakers that produce the tones may be located at locations of the wagering game machine 560 that would be near the wearable 533, such as at or near a button panel 566, below the wagering game machine 560, and on an armrest of a chair that is associated with the wagering game machine 560. In some examples, the speakers that produce the tones are separate from speakers used to present audio content for wagering games. In some examples, the system can produce tones within the range of approximately 14 kilohertz to approximately 20 kilohertz in a way that even a player with exceptional hearing would not hear the tones. For example, if the speaker used to produce the tone is far from the player's ears (e.g., if the speaker is positioned under the wagering game machine), then the system may be able to produce the tone with a low enough volume and with a specific enough directionality, that the sound energy of the tone would only reach the wearable and not the player's ears. In some embodiments, the tone can include additional data, such as an audio watermark.

In some embodiments, the wagering game machine 560 can produce imperceptible vibrations, which are detectable by a wearable (e.g., wearable 535) and not necessarily detectable by the human sense of touch and/or distinguishable from background vibrations.

In some embodiments, the wearables 531, 533, and 535 can transmit information about the gaming events to a mobile device 540. The mobile device 540 can use the information about the gaming events (e.g., analyze the information, categorized the information, interpret the information, etc.) to generate game-related data (e.g. a play history 541).

In some embodiments, as shown in FIG. 5, instead of, or in addition to, tones, the wagering game machine 560 can produce an imperceptible light pattern 504 using visible light communication (VLC), such as those generated by Li-Fi™ technologies. For example, the wagering game machine 560 is capable of bidirectional, high speed and fully networked wireless communications using visible light (e.g., light wavelengths of approximately 390-750 nm). VLC systems take advantage of light emitting diodes (LEDs) which can be pulsed at very high speeds without a noticeable effect on an ambient lighting output perceptible to the human eye. For example, at least some of the LEDs can pulse light in patterns so quickly that they are imperceptible to the human eye amongst other environmental lighting ("imperceptible light patterns"). The imperceptible light patterns represent a data stream. The imperceptible light patterns can be detected by VLC light sensors. A VLC controller can receive a representation of the patterns from the VLC light sensors and interpret the patterns as data. For example, the imperceptible light patterns (e.g., light pattern 504) can represent the game events indicated in the database 562. The wearable 531 can include light sensors that detect the light pattern 504. In some embodiments, the wearable 531 is configured to detect light that has a low luminosity level that is not perceptible to human eyes ("imperceptible light level"). The wagering game machine 560 can produce the light pattern 504 at the imperceptible light level. The wagering game machine 560 can incorporate VLC LED lights into displays of the wagering game machine 560 and/or in locations that surround the displays. The wagering game machine 560 can also direct the light pattern 504 so that it is detectable only to wearables of the player of the wagering game machine 560, and not by wearables of players at neighboring wagering game machines.

In some embodiments, the system includes a wearable that includes VLC LED lights and sensors ("VLC wearable"). For example, the VLC wearable may be a printed electronic label attached to a badge, a wristband, or other clothing. The VLC wearable can be activated upon wearing the device (e.g., automatically connect to the player's mobile device, automatically connect to a wireless body area network, automatically begin transmitting and/or receiving VLC data, automatically connect to a wagering game machine, automatically connect to a secondary gaming system, etc.). The VLC wearable can be used in various ways. For example, the VLC wearable can be used as a player loyalty card, for player management, for casino analytics, for direct and indirect gaming activity, for non-gaming activities performed in a casino (e.g., in connection with an operator's gaming services), and so forth. The following are some non-limiting examples of a VLC wearable.

VLC Loyalty Program Wearable.

Figure 15:
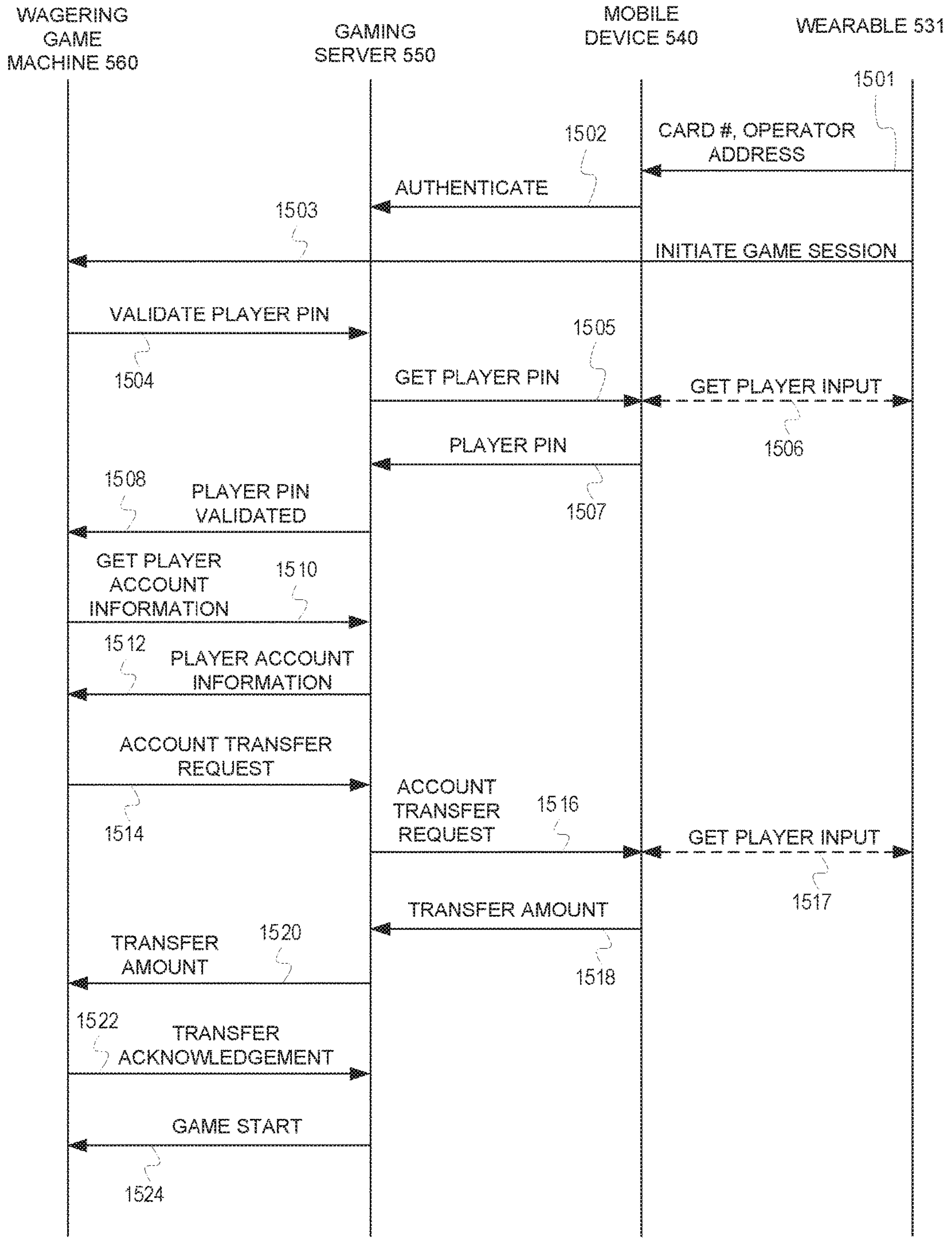
FIG. 15 is an illustration of using visual light communications and one or more wagering game wearables, according to some embodiments.

In some embodiments, the VLC wearable provides the functions and features associated with a casino loyalty program (e.g., as a casino loyalty card) for a player account. FIG. 15 illustrates an example of using a VLC wearable as a casino loyalty card. FIG. 15 will refer to various elements of FIG. 5. For example, in FIG. 5, the wearable 531, which is VLC enabled, includes information for a casino loyalty program for a given casino. For instance, the wearable 531 may be encoded with the information when the user enters the casino (e.g., via a registration process with the casino). In other instances, a VLC device, with the information encoded into it, may be provided by the casino and fastened to, or incorporated into, the wearable 531. Referring to FIG. 15, at stage 1501, the wearable 531 provides, via VLC communications (e.g., via light pattern 505 shown in FIG. 5), an encrypted unique loyalty card identification number and a corresponding operator address (e.g., a computer network address) to the mobile device 540. At stage 1502, the mobile device 540 can, via a mobile application, automatically authenticate the VLC wearable with the operator's loyalty card system (e.g., with a gaming host associated with gaming server 550). Once authenticated, the wearable 531 can, at stage 1503, initiate a gaming session with the wagering game machine 560 (e.g., via VLC or Li-Fi communication). In some examples, when the gaming session is initiated, a Player User Interface (PUI) is invoked, as implemented per the PUI guidelines of the Gaming Standards Association Operator Advisory Committee (GSA OAC). The wagering game machine 560 performs a login process for the player account associated with the loyalty program. For example, at stage 1504, the wagering game machine 560 can initiate a series of operations to obtain and validate a player's personal identification number (PIN). For instance, the wagering game machine 560 requests that the gaming server 550 obtain the PIN from the player. At stage 1505, the gaming server 550 requests the player PIN from the mobile device 540. In some embodiments, at stage 1506, the mobile device 540 can obtain player input via the wearable 531. For example, the wearable 531 can present a request for the player to enter their PIN via user input with the wearable 531. The wearable 531 can then communicate the user input to the mobile device 540 (e.g., via VLC). In other instances, the gaming server 550 can communicate directly with the wearable 531 instead of communicating with the mobile device 540. At stage 1507, the mobile device 540 communicates the PIN to the gaming server 550, which validates the PIN. At stage 1508, the gaming server 550 communicates to the wagering game machine 560 that the PIN was validated. At stage 1510, the wagering game machine 560 then requests player account information (e.g., an account balance, an amount of credits, rewards that a player has earned, game play history, etc.) from the gaming server 550, which the gaming server 550 provides at stage 1512. In some instances, the wagering game machine 560 securely connects to a financial account (e.g., a debit card stored value account) which can be used for gaming. For example, at stage 1514, after the wagering game machine 560 receives the player account information, the wagering game machine 560 requests a transfer of funds from a player account to fund a gaming session on the wagering game machine 560. At stage 1516, the gaming server 550 receives the request to transfer funds and requests the mobile device 540 to verify a specific amount. In some embodiments, at stage 1517, the wearable 531 presents the request and/or detects player input (e.g., a player indicates, via the wearable 531, an amount to transfer, which the wearable 531 communicates via VLC). At stage 1518, the mobile device 540 communicates to the gaming server 550 the amount to transfer. At stage 1520, the gaming server 550 transfers the amount to the wagering game machine 560, which the wagering game machine 560 presents via a credit meter. At stage 1522, the wagering game machine 560 acknowledges, via a communication with the gaming server 550, that the amount of the transfer was received. At stage 1524, the gaming server 550 can initiate the start of the gaming session. In some embodiments, if the wagering game machine 560 needs gaming content, the gaming server 550 provides the gaming content. In other embodiments, the gaming server 550 may not need to indicate the start of a gaming session. Instead, the wagering game machine 560 can initiate the start of the gaming session (e.g., permit play of a wagering game) and report to the gaming server 550 that the gaining session has started. During the stages shown in FIG. 15, any one, or more, of the wagering game machine 560, the gaming server 550, and/or the mobile device 540 can communicate via VLC. Furthermore, the wearable 531 can communicate with other casino devices via VLC using player account information, such as to initiate a drink request, or order other amenities associated with a casino's products and services. In yet other examples, the wearable 531 can communicate with a secondary content controller configured to provide secondary gaming content independent of primary gaming content of a wagering game machine 560.

Intelligent Player VLC Tracking and Feedback Mechanism.

In some examples, a VLC wearable is activated when a player enters a casino. For instance, the VLC wearable can automatically connect with a smart lighting system (e.g., a Li-Fi system) in the casino. The VLC wearable can include VLC transmitters and optical sensors to detect VLC communications (e.g., to detect Li-Fi communications). The VLC wearable can include cameras that can record video and photographs. The smart lighting system in the casino can also include VLC enabled devices as well as other tracking devices (e.g., cameras, heat sensors, noise sensors, etc.). As the player traverses the casino, the VLC wearable continuously captures real-time information of the current environment's objects (e.g., machines, players, casino personnel, etc.) and events, such as when a jackpot is hit by a nearby wagering game machine, when specific advertisements or offers are presented, when certain people are nearby, when specific games are offered, when long lines occur, when hazards appear, when signs of bad behavior are apparent, when suspicious activity occurs, etc. The VLC wearable can immediately respond to the events providing feedback to the casino. For example, the VLC wearable can communicate with the smart lighting system to provide lighting to given locations in the environment. The VLC wearable can further connect with others in the environment, including players and casino personnel who are near an event and/or who are involved in an event. The smart lighting system can offer, via the VLC wearable, prizes and incentives for those who are near the events. The VLC wearable can also connect with a player's mobile device (e.g., smartphone), or other wearables (e.g., head wearable), to provide information related to the events that were detected by the VLC wearable. For example, the VLC wearable can communicate to the player's mobile device about routes throughout the casino based on the events (e.g., routes to avoid long lines, routes around hazards, routes to specific promotions, etc.). The player's mobile device can then present those routes via the player's head wearable. In some cases, if the VLC wearable is a head wearable, it may directly present the routes for the player's view. In other instances, the smart lighting system can communicate data about the routes to light fixtures in the smart lighting system. The light fixtures can then provide lighting that directs the player on the paths (e.g., the smart lighting system causes emotive lighting on specific casino devices to light up and/or change a certain color to guide the player to a specific location).

VLC Network.

In some instances, VLC enabled gaming devices, VLC wearables, etc. can be connected as VLC network nodes in a VLC network. The VLC network nodes are equipped with LEDs, lasers, holographic devices, and/or other visual display devices. The VLC network nodes may include gaming devices of all sorts, such as free-standing wagering game machines, mobile gaming devices, gaming tables, casino displays, etc. The VLC devices attached to each node can communicate with VLC devices of other nodes within visual proximity. The VLC devices of the nodes can communicate with high-speed data communications (e.g., ultra-parallel visible light communications). In some instances, the nodes can have shared game interactions using the VLC devices. The nodes can display visual indicators of linked nodes to indicate information about the nodes and/or their communications. For example, the visual indicators can indicate a status of a connection, a status of a communication, a game interaction, a link speed, a data transmission, a game state (e.g., start, pause, in progress, end, restart), a required number of players, a lack of connection, a loss of connection, a connection termination, a timer, a malfunction, etc. In some instances, the linked nodes can have matching visual indicators. For example, a player's identification and/or status on a wearable can match with that on a gaming device and/or on other wearables that may have a shared game interaction. In some embodiments, the VLC network can include a common visual display in a casino that provides information about node connections and game participation that occurs via the VLC network. In some embodiments, the VLC network provides for group gaming (e.g., community wagering games, Bingo, Keno), parimutuel betting, or other types of gaming involving multiple betting entities. In some examples, the VLC network can provide a look up to see the players that are involved in group games and their odds as they connect to the game.

FIG. 5 illustrates one example of a VLC network. In FIG. 5, any, or all, of the devices depicted can be equipped with a VLC (e.g., Li-Fi) enabled light source capable of two-way communications via light patterns. For example, the wearable 531 can transmit a light pattern to, and/or receive a light pattern from, the mobile device 540, the wagering game machine 560, the wearables 533 and 535, the gaming server 550, and any other device in a casino environment. The wearable 531 and any other device connected via Li-Fi create a network on top of an existing casino network 522. The new Li-Fi network of Li-Fi enabled devices may be referred to as a Li-Fi mesh network. The Li-Fi mesh network allows controlling each device directly and each device can communicate and exchange data directly with each other, thereby creating intelligence in the network itself. This Li-Fi mesh network provides local access and control within the casino environment.

VLC Game Table.

In some embodiments, the system includes a game table with VLC capabilities ("VLC game table"). In some examples, the VLC game table combines dynamic multimedia displays, directional audio, light-sensors, LED transmitters, optical recognition, and augmented reality to enable game play. The VLC game table can automatically assist and coordinate local and remote players via a real game surface. In some examples, LED transmitters, cameras, projectors, speakers, light sensors, etc. are incorporated into the VLC game table, placed around the table, and or positioned within a visual range to the VLC game table. For example, a casino craps tables can contain multiple LED transmitters and light sensors embedded into its walls. In some instances, the VLC game table can include gaming chips (e.g., electronic poker chips) that have VLC devices (e.g., LEDs) on the surface. The VLC chips can transmit light data that indicates their value. Light sensors associated with the VLC game table can detect a number of the chips and values of the chips. Consequently, the VLC game table can detect, via the VLC data from the chips, an amount of bets placed on the game surface of the VLC game table. The VLC game table can further enable local and remote coordination and reconciliation of bet values made and transacted on the VLC game table. Further, in some examples, the VLC game table can communicate with VLC wearables of players at, or around, the VLC game table.

VLC Casino Analytics.

In some examples, the system can obtain analytics on players, wagering game machines, wearables, and other devices in the casino that utilize VLC. The analytics can be used, for example, to predict and avoid problems with usage and performance, determine maintenance needs of gaming devices, detect suspicious and/or illegal activities, etc.

Electroencephalographic (EEG) VLC Wearable.

In some examples, a head wearable includes electrodes that are attached to a player's scalp. The head wearable is configured to measure electrical activity of the player's brain. The head wearable includes VLC devices and sensors configured to communicate with casino devices. The head wearable can measure and visually indicate a player's mood, level of excitement, enjoyment of an event, etc. while playing a wagering game, or participating in any event, within a casino.

VLC Gaming Security.

In some embodiments, gaming data may be securely transmitted via VLC instead of via other communication technologies. For example, communications made via Wi-Fi™ can pass through walls and may be detected by devices outside of a casino or casino floor. However, VLC communications are limited to a visible range. Thus, data communication via VLC is limited to a direct visual field of view and, to a lesser extent, a reflection off of surfaces of walls and other objects in the immediate vicinity. Therefore, communications made via a VLC network, such as Li-Fi, can be broadcast to a limited range, making the communications potentially more secure in some scenarios. Furthermore, the VLC light communications can be directed and shaped for secure and precise placement and transmission of some gaming data (e.g., the LED light bulbs of a VLC device can be facing a location only in front of a wagering game machine, lenses can focus the visible light from the LEDs into a point or flatten the visible light into a plane, physical barriers can block some of the visible light from the LEDs and prevent it from being detected peripherally, light pipes can channel the visible light into fiber optic wires, etc.).

VLC Blended Gaming Content.

In some embodiments, content for a gaming light presentation (e.g. for a light show, for an attract sequence, for a celebratory effect of a game, etc.) can include VLC communications. The light for the gaming light presentation can be pulsed according to VLC communications. The pulsed light patterns can change colors and be timed according to gaming light presentation parameters. For example, a celebratory effect may be triggered when a "win" event occurs in a wagering game. Game logic can cause at least a portion of the celebratory effect to be presented via at least some emotive lighting devices on the wagering game machine according to certain colors for a given amount of time (i.e., for a timed presentation duration). A VLC controller can detect that the celebratory effect is being presented, or is about to be presented, and can cause the celebratory effect to pulse on the emotive lighting devices according to a VLC data pulse pattern. The VLC data pulse pattern can specify various aspects of the gaming event and/or conditions associated with the gaming event (e.g. identifies the event as a "win" event, identifies a win rate for the player at the wagering game machine, identifies an amount of time since the player last won, identifies an amount of the win, etc.). A player's VLC wearable can detect the light patterns and use the data from the light patterns for additional content presentation, for tracking purposes, etc. At the same time, the game logic causes the celebratory effect to change colors of the emotive lighting devices according to gaming instructions. Further, the gaming logic can cause the emotive lighting devices to terminate presentation of the celebratory effect after the timed presentation duration. In some embodiments, the VLC controller can override a pulsing pattern of the celebratory effect, for at least a portion of the timed presentation duration, and replace pulsing pattern with a VLC pulse pattern. In some embodiments, the VLC controller can select the portion of the lighting elements of the wagering game machine that will present the VLC data based on a location of the VLC wearable. For example, the VLC controller can detect that a player is wearing the VLC wearable at eye level. Consequently, the VLC controller can cause emotive lighting devices at a top portion of the wagering game machine to pulse. In other examples, the VLC controller may detect machine and/or player issue(s) (e.g., a problem with the wagering game machine, a maintenance issue of the wagering game machine, a comfort issue with a player, a service order of the player, loss statistics of the player, etc.). For instance, the VLC controller can cause general lighting presentations of the wagering game machine to pulse according to a VLC pulse pattern, which identifies the machine and/or player issue(s). A casino employee (e.g., a technician, a server, a pit boss, etc.) that walks the casino floor can wear a VLC wearable (e.g., a VLC head wearable) that detects the VLC pulse pattern that identifies the machine and/or player issue(s). The VLC wearable can then provide information to the casino employee about the machine and/or player issue(s).

Using Biometrics from Wearables in Gaming

The following sub-section describes examples of using biometrics from wearables in gaming.

Providing a Gaming Response to Biometrics from Wearables.

In some embodiments, a wagering game system ("system") is configured to provide a gaming response to biometrics from wearables, such as, but not limited to, the following examples.

In some embodiments, the system is configured to obtain biofeedback from a wearable to indicate an emotional state of a player (e.g. excitement, disappointment, annoyance, anger, stress, calm, happiness, boredom, tiredness, etc.). In some examples, the system can detect a degree of the emotional state (e.g. a level of excitement, a degree of disappointment, etc.) based on biometric data provided by the wearables in response to gaming events. For instance, the system can determine a level of excitement between game types or game rounds. The system can determine a degree of annoyance or frustration with a game, a machine setting, a control, etc. In some examples, the system can receive biometric data from the wearables. The biometric data may include, but is not limited to, sweat levels, bodily temperature, heart rate, glucose level, breath content, body movements, eye movements, sounds of behaviors (e.g., sniffling, crying, swearing, etc.), brain-waves, and any other type of biometric data that can be detected from the player. In some examples, the biometric data can be communicated via a wireless signal to a wagering game machine. For example, in FIG. 6, wearables 631 and 633 provide biometric data 602 to a wagering game machine 660 during one or more wagering game sessions. The wearables 631 and 633 can provide different portions of the biometric data at different times. In some examples, the biometric data can be communicated to the wearables via electrical conductance of a player's skin.

Figure 6:
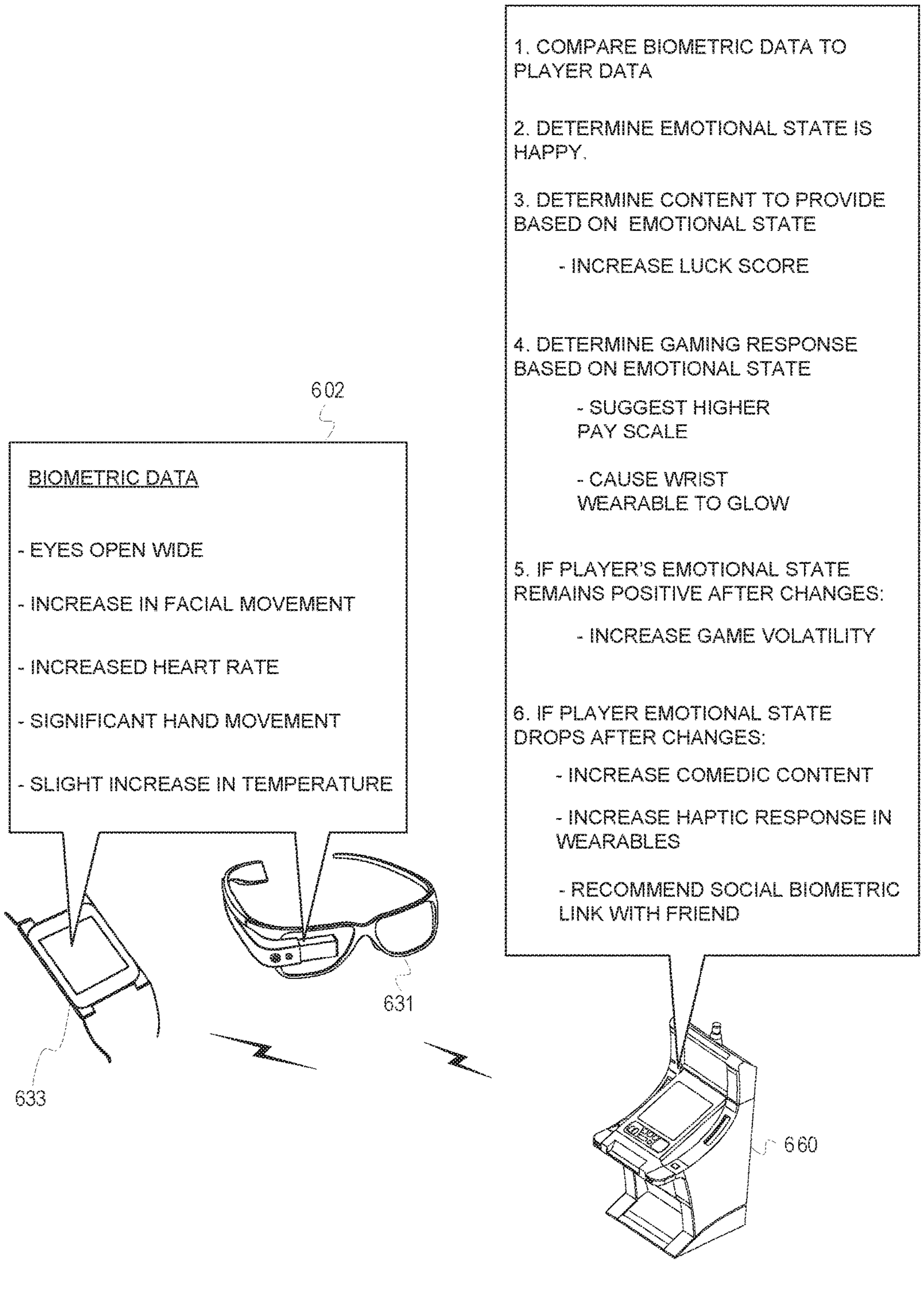
FIG. 6 is an illustration of causing wagering game activities based on analysis of biometric signals from wagering game wearables, according to some embodiments.

In some embodiments, the system evaluates current biometric data with past biometric data to determine the emotional state. For example, the system can access a biometric profile for a player, which includes a history of biometrics and/or analysis of the biometrics. The system can refer to the biometric profile to determine a baseline emotional state of a player. The system can then compare current biometric data to the baseline data to determine a difference in emotional state from the baseline. For example, as shown in FIG. 6, the wagering game machine 660 compares the biometric data 602 to player data and determines, based on the comparison that a player is in a happy emotional state.

In some embodiments, the system can analyze, over time, a player's biometrics and accompanying reactions or activities that occurred at the time the biometrics were detected. The system can thus learn a player's behavior, reactions, emotions, etc. for various scenarios.

In some embodiments, the system can calculate a luck factor based on biometric data. In some examples, the system can detect a scenario that has produced a positive emotional state, such as when the player wins a game, when the player receives a bonus reward, etc. At those times, the system can increase a luck factor and then indicate, via a wearable, that the player is in a lucky state. As shown in FIG. 6, the wagering game machine 660 determines content to provide based on an emotional state, including increasing a luck score.

In some embodiments, the system can respond to the emotional state of the player. For example, the system can change anticipation presentations and reveals based on biofeedback and emotional state. In some examples, the system can modify lighting and sound levels of a game, such as increasing a display contrast when a player appears tired. In some examples, the system can modify animations (e.g., slow down, customize, etc.) when a player is in a certain emotional state. In some embodiments, the system can detect a gaming presentation event that angered or annoyed the player. The system can then store in the player profile an indication of the emotional state, the biometric data, and the events. The system can thus avoid, if possible, performing the same gaming presentation event for the player. In FIG. 6, the wagering game machine 660 determines a gaming response based on an emotional state of a player, such as by suggesting a higher pay scale when the player is happy or causing the wearable 633 to glow. The wagering game machine 660 also determines that if the player's emotional state (based on continued analysis of biometrics) remains positive, the wagering game machine 660 will increase a game volatility. The wagering game machine 660 also determines that if the player's emotional state turns negative (based on analysis of biometrics), then the wagering game machine 660 will increase a comedic content of a wagering game, increase a haptic response presented by the wearable 633, and/or recommend a biometric link with a friend, whereby both biometrics are shared and used for presenting game responses and/or recommending content to the player and the friend. In some embodiments, the system can determine, using biometrics from a wearable, that a player has experienced negative emotions related to a loss in a wagering game. The system can then respond by providing a benefit to the user, such as a reward, additional content, a complimentary, etc. The system can further monitor the biometrics, via the wearables, to determine what benefit caused the negative emotional state to change to a positive emotional state. The system can store the information about the benefit and use the information in future situations for the player.

In some embodiments, the system can offer benefits to the player to actively manipulate their current emotions. For example, the system can request a player to lower their heart rate. In response, the player can receive a special bonus. The system can detect, via wearables, whether the player has responded. In some examples, the system can provide options to assist the player, such as by playing soothing music via an ear wearable, causing an eye wearable to present a soothing color (e.g., blue), causing a wrist wearable to vibrate soothingly, etc.

In some embodiments, such as in a social game contest, the system can tie a payout of a social game to a player's emotional state. For example, if the player is in a negative emotional state (e.g., angry, depressed, tired), then the system can pay more virtual funds to change the player's emotional state.

In some embodiments, the system can algorithmically adjust an award rate in a way that gets a player to perform certain actions, such as to spend more money, to stop gambling, to change games, etc.

In some embodiments, the system can identify a stressed person to the casino so that the casino can give them a complimentary, provide loyalty points, etc.

In some embodiments, during a wagering game session, the wagering game system can hold back a portion of some of the player's wins in the early rounds of wagering game session. For example, the system can hold back 10% of a player's early winnings in an escrow account for the player without the player knowing. Later, when the player is beginning to feel less positive, the system could present some, or all, of the held back winnings as if they were won in the later play rounds. In some examples, the system can provide a bonus game with the held back winnings. At cash out, the remainder of the hold back would be paid out. In other examples, the amount paid to the player is not winnings from an event, but may instead be a set amount that will be paid out to the player at the beginning of the wagering game session.

In some embodiments, the system can award a particular bonus or other game (e.g., a "for fun" game, a bonus, etc.) based on an emotional state of a player. For example, for one emotional state (e.g., negative emotional state) the system may provide a low-keyed bonus (e.g., 20 spins using a 1× multiplier), but for a second emotional state (e.g., a positive emotional state) the system may provide an exciting bonus (e.g., 5 spins at a 4× multiplier), or vice versa.

In some embodiments, the system can give permission for other players at a gaming table or wagering game bank to access a player's biometric information and vice versa. In some examples, the system can group players that have similar biometrics and similar detected emotions.

In some embodiments, the system can detect a physical or metabolism goal of a player from one or more wearables of the player. The system can then use the physical or metabolism goal in a wagering game.

In some embodiments, the system can use a wearable as a training mechanism, such as to provide training on how to play a particular game (e.g. Poker). The system can detect, and use, biometric data from the player to detect the player's understanding, frustrations, or other emotions regarding the training. If the biometric data indicates that the player is not readily understanding the training, the system can suggest a different wagering game, and or provide game instruction, via the wearable, as the game is played.

Determining Gaming Content Based on Biometrics History from Wearables.

In some embodiments, a wagering game system ("system") is configured to determine gaming content based on biometrics history from wearables, such as, but not limited to, the following examples.

In some embodiments, the system can select a wagering game to present and/or recommend based on a player's biometric profile. For example, in a previous gaming session, the system tracks all game events that occur, as well as biometric readings (detected via the wearable (s)), which occurred at corresponding times to the game events (e.g., certain biometric responses when a certain game is played, when a certain symbol combination occurs in a wagering game, when a certain payline gets a hit, and so forth). In a current gaming session, the system can compare current biometric readings to past data. In response, the system can recommend specific content for the player. Further, the system can determine how to present game content in a current game session based on the past data.

In some examples, the system can also compare past and current data for other players that may have similar biometric profiles as the player.

In some embodiments, the system analyzes the events of other players that were around the player during the past events. For example, if the player is surrounded by other players that had positive events and emotions (e.g., if the player's friend was winning), then the system can take that into account. For instance, the system may disregard some of the data if it is anomalous to the player's own data or past history.

In some embodiments, the system can detect biometric data from a player when the player is playing online games. For example, a player may wear a wearable when playing online games at home. The wearable can store information about the player's biometrics and about game play data. When the player visits a casino with the wearable, the system can detect the past data from the online game session and use the data to select, recommend, or adapt presentation of content at the casino. In some embodiments, when the player is online, the player may not be wearing the device, but the system can still detect certain information about the online gaming session and cause the wearable to glow. In some embodiments, the system can cause information to be stored in the wearable so that when the wearable comes to the casino, the information is sent to a casino server for analysis.

In some embodiments, the system can recommend a specific wagering game machine. The system can cause a wearable to glow, vibrate, or respond in other ways when a player approaches the wagering game machine.

In some embodiments, the wearable may be smart, and talk to wagering game machines, as it moves through a casino. For example, the wearable can communicate with the other machines using inaudible tones, as mentioned previously. In some examples, the wagering game machines may have different categories of content. The wearable can detect and compares the category to a recommended content type or to a history of data on the wearable. The wearable can then glows, or gives other indicators when a particular wagering game machine is of a specific recommended type.

In some embodiments, the system can recommend a cut off limit to losses based on biometric feedback.

Gaming Operator Wearables

The following sub-section describes examples of gaming operator wearables. In some embodiments, a wagering game system ("system") is configured to provide casino employees with wearables to provide specific activities, such as, but not limited to, the following examples.

Figure 7:
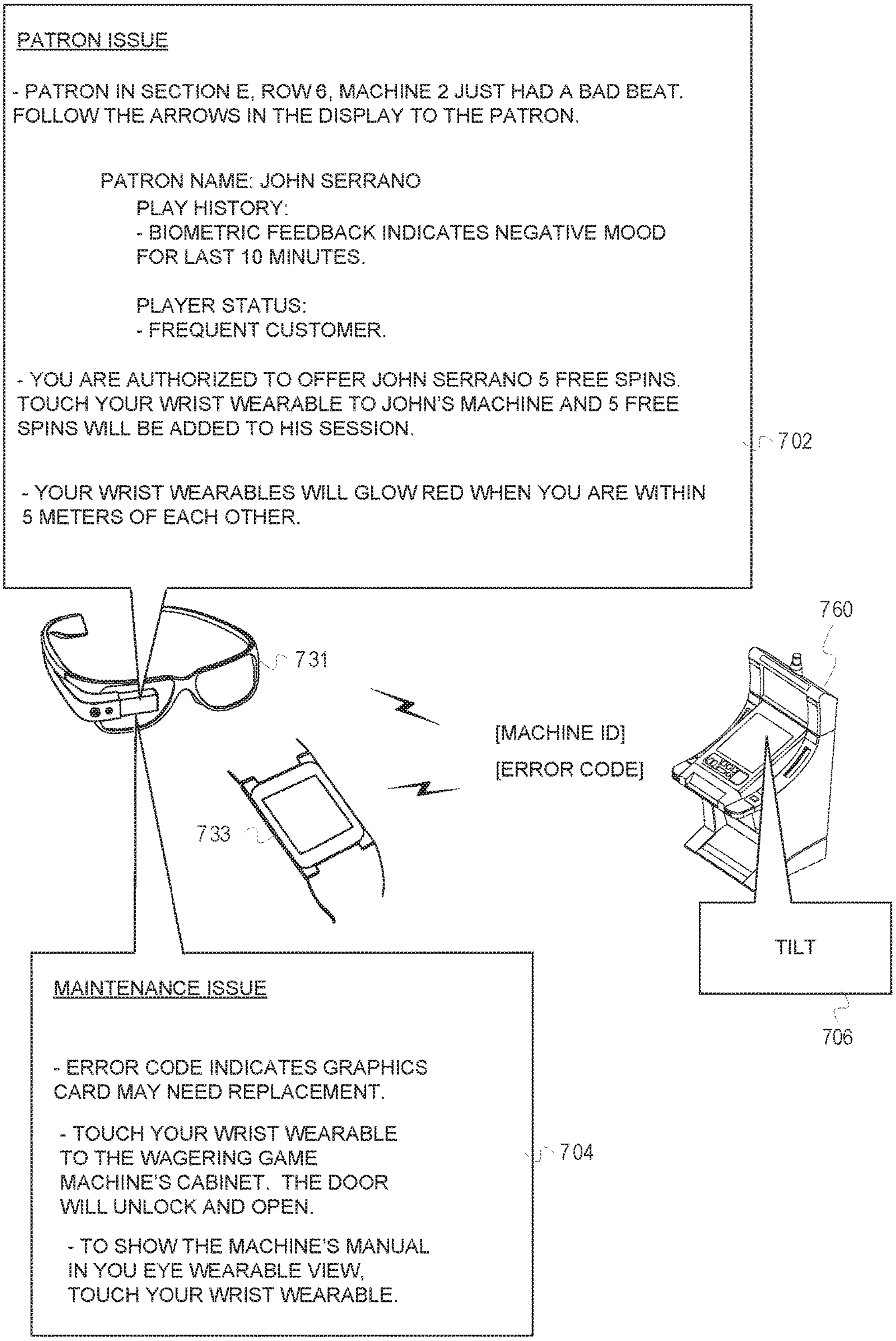
FIG. 7 is an illustration of activating features of a wagering game machine via use of a wagering game wearable, according to some embodiments.

In some embodiments, the system can notify a casino employee (e.g., a pit boss, a technician, a server, a bar tender, etc.), via a wearable, of a need of a casino patron. For example, as depicted in FIG. 7, a wearable 731 of a casino employee presents a notification message 702 about a player and their playing activity. For instance, the wearable 731 indicates that a player at a certain machine had a bad beat (e.g., a game in which the player nearly won a large portion of money, but failed to do so). The wearable 731 can provide, based on biometric feedback obtained from the player's wearable, that the player has had a negative emotional state. The wearable 731 also indicates player data, (e.g., age, demographics, player status level, etc.). For instance, the message 702 indicates that the player has been a loyal and frequent customer for a certain period of time). Consequently, the wearable 731 detects, from a casino system, that the casino employee is authorized to provide a certain prize to the patron (e.g., 5 free spins). The wearable 731 indicates that the casino employee can add the free spins by touching a wearable 733 to a wagering game machine at which the player is seated. In some embodiments, the wearable 731 receives information from the player's machine, such as by inaudible tones and imperceptible light signals, as mentioned previously.

In some embodiments, wearables can track all activities performed by a casino employee. Casinos can use the information to improve customer service, evaluate employees, improve casino security, and so forth.

In some embodiments, the system can notify a technician, via a wearable of the technician, about a need of a wagering game machine. In some embodiments, the need is a regular maintenance need. For example, as a technician walks by a wagering game machine, the wagering game machine can notify the technician, via a wearable, that the wagering game machine is low on paper and that the paper hopper should be replaced soon. In other instances, the system notifies a technician, via a wearable, about an error that occurs via a wagering game machine. For instance, as shown in FIG. 7, the wearable 731, which belongs to the casino employee, is notified by a message 704 that wagering game machine 760 has an error (i.e., the wagering game machine 760 has a general tilt error 706). The wearable 731 and the wearable 733 can detect from the wagering game machine 760 a machine identifier and an error code. The wearables 731 and 733 can communicate with a gaming server to identify the error code. The wearable 731 then presents, via message 704, a meaning of the error code (i.e., that the wagering game machine 760 has a bad graphics card which needs to be replaced). The message 704 further indicates that the casino employee can unlock a maintenance door for the wagering game machine 760 by touching the wearable 733 to the wagering game machine 760. Further, the message 704 indicates an option to view a manual for the wagering game machine 760. In some embodiments, the wearable 731 can provide an augmented reality tutorial on how to make repairs and/or perform maintenance on the wagering game machine 760.

Example Operations

This section describes examples operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 8:
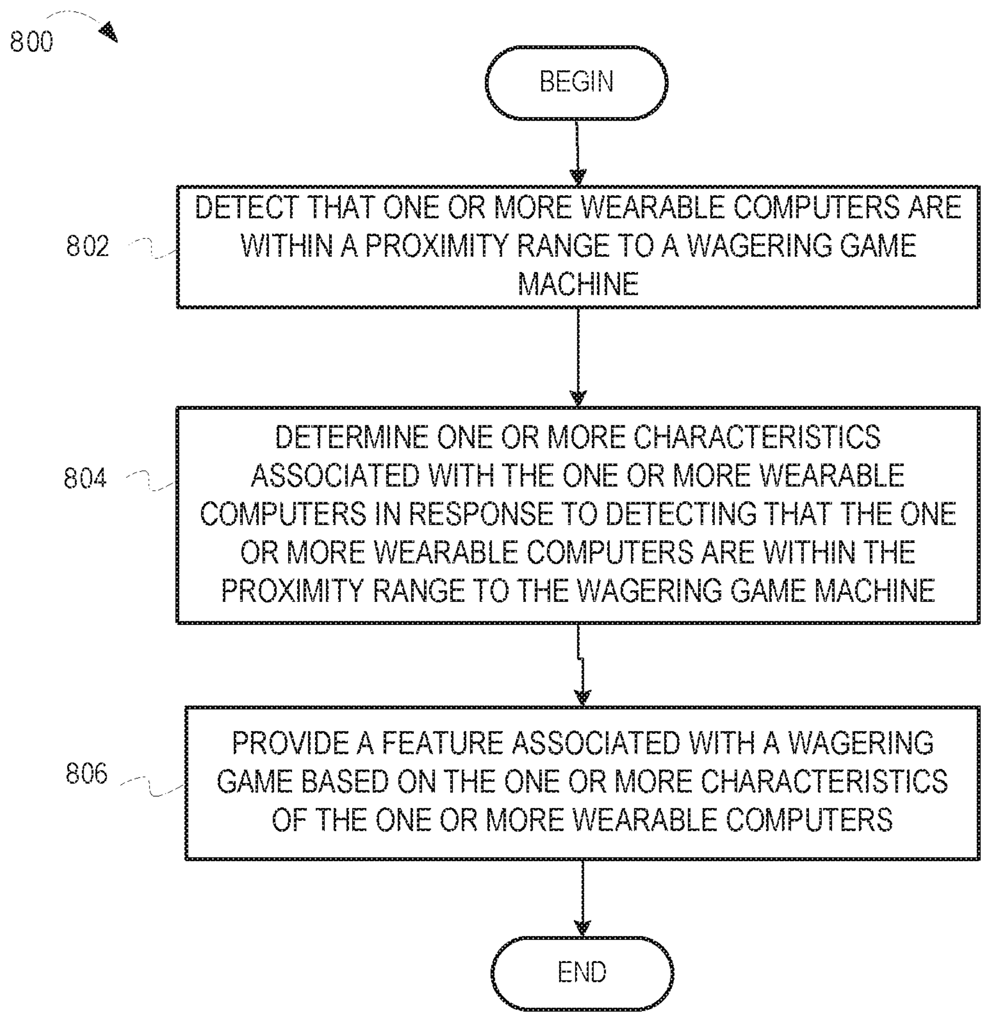
FIG. 8 is a flow diagram 800 illustrating providing gaming features based on wagering game wearables, according to some embodiments.

FIG. 8 is a flow diagram ("flow") 800 illustrating providing gaming features based on wearable computers, according to some embodiments. In FIG. 8, the flow 800 begins at processing block 802, where a wagering game system ("system") detects that one or more wearable computers are within a proximity range to a wagering game machine. For example, the system can utilize wireless communication, near-field communication, visual detection, Visible Light Communications (VLC), etc. of the wearables.

The flow 800 continues at processing block 804, where the system determines one or more characteristics associated with the one or more wearable computers in response to the detecting that the one or more wearable computers are within the proximity range to the wagering game machine. For example, in some embodiments, the system can determine a type of the wearable. For instance, in some embodiments, the system can determine that a first wearable, of a first type, and a second wearable, of a second type, are both simultaneously associated with play of a wagering game at a wagering game machine. The first type of wearable may be an eye wearable. The second type may be different from the first type, such as a wrist wearable.

The flow 800 continues at processing block 806, where the system provides a feature associated with a wagering game based on the one or more characteristics of the one or more wearable computers.

In some examples, the system can activate a feature of the wagering game machine in response to detecting that a first wearable (of a first type) and a second wearable (of a second first type) are both being used in a wagering game at the same time. In some examples, one of the wearables can send an invitation to another of the wearables, such as in a joint play scenario described previously.

Figure 9:
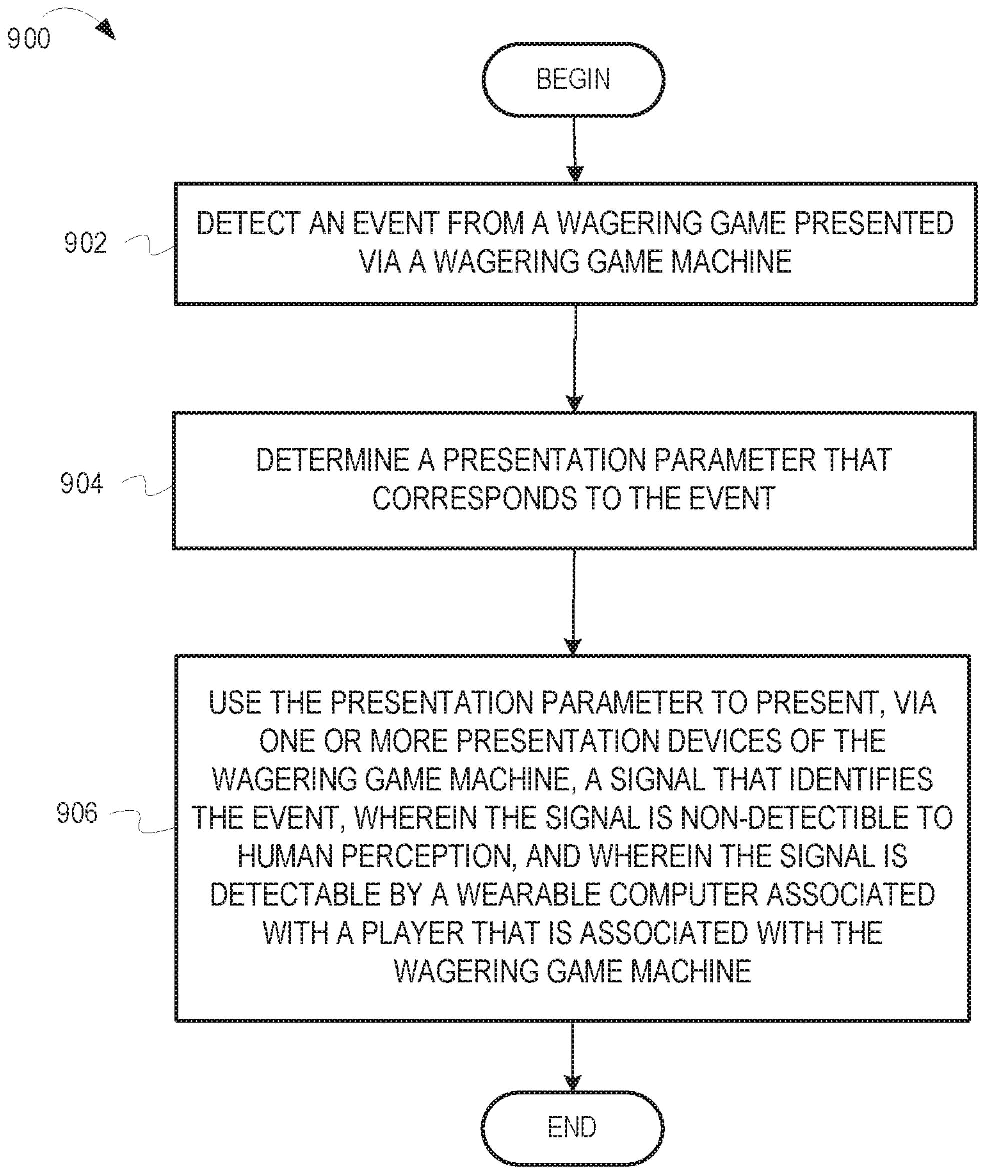
FIG. 9 is a flow diagram 900 illustrating providing wagering game event data to a wagering game wearable, according to some embodiments.

FIG. 9 is a flow diagram ("flow") 900 illustrating providing wagering game event data to a wearable computer, according to some embodiments. In FIG. 9, the flow 900 begins at processing block 902, where a wagering game system ("system") detects an event from a wagering game presented via a wagering game machine. The event may be any type of event that occurs during a wagering game session, such as an event that starts the gaming session (e.g., a cash-in event, a card swipe, a funds transfer, etc.), a game play event (e.g., a betting action, a spinning action, etc.), a game outcome (e.g., a win or loss), etc.

The flow 900 continues at processing block 904, where the system determines a presentation parameter that corresponds to the event. For example, the presentation parameter may be a frequency, a pattern, a power level, etc. at which to generate the signal.

The flow 900 continues at processing block 906, where the system uses the presentation parameter to present, via one or more presentation devices of the wagering game machine, a signal that identifies the event. In some examples, the signal is non-detectable to human perception. Further, the signal is detectable by a wearable associated with a player at a wagering game machine. In some instances, the wearable is paired with the wagering game machine prior to occurrence of the event.

In some examples, the signal is a tone with a frequency that is imperceptible to human hearing as described previously in connection with FIG. 5. In some instances, the tone is at or above approximately 14 kilohertz. A tone at or above approximately 14 kilohertz can be more easily directed to an area of a wagering game machine at which the wearable computer is location than tones of lower frequencies. For instance, the tone can be directed to a location associated with a chair of the wagering game machine, an area directly in front of a display of the wagering game machine, a button panel of the wagering game machine, and an area below a display of the wagering game machine, etc. In some examples, the system can transmit the inaudible tone with an encryption code that is decodable by the wearable computer based on a pairing between the wearable and the wagering game machine.

In other examples, the signal is a light pattern with a luminosity level that is imperceptible to human vision. In yet other examples, the signal is a vibration pattern or frequency. In some examples, the wearable device is in contact with skin of the player. The signal can be transmitted, via electrical conductance of the skin of the player, to the wearable device. In some embodiments, a gaming device (e.g., a wagering game machine) can interact with a body area network. A body area network (BAN) is also referred to as a wireless body area network (WBAN) or a body sensor network (BSN). A BAN is a wireless network of wearables. Some BAN devices can also be embedded inside the body, such as implants. Some BAN devices may be surface-mounted on the body. In a BAN, the wearables can function as body sensor units. One of the wearables can function as a central unit to which all of the other wearables communicate. The wearables can intercommunicate with each other and with accompanying devices carried by a player (e.g., in their pocket, in their hand, in a bag) such as a mobile device. In some embodiments, the gaming device can communicate with some wearables in a BAN by communicating with a first wearable device (e.g., a wrist wearable, a finger wearable), which may be in direct contact with, or sufficiently close to, a wagering game machine's surface or transmitter. The first wearable device can then communicate to other wearable devices (e.g., to a chest wearable, to feet wearables, to a head wearable, etc.) which may not be in direct contact with, or sufficiently close to, a wagering game machine's surface or transmitter. The wearables in the BAN can communicate via conductivity of the body (e.g., via the skin).

Figure 10:
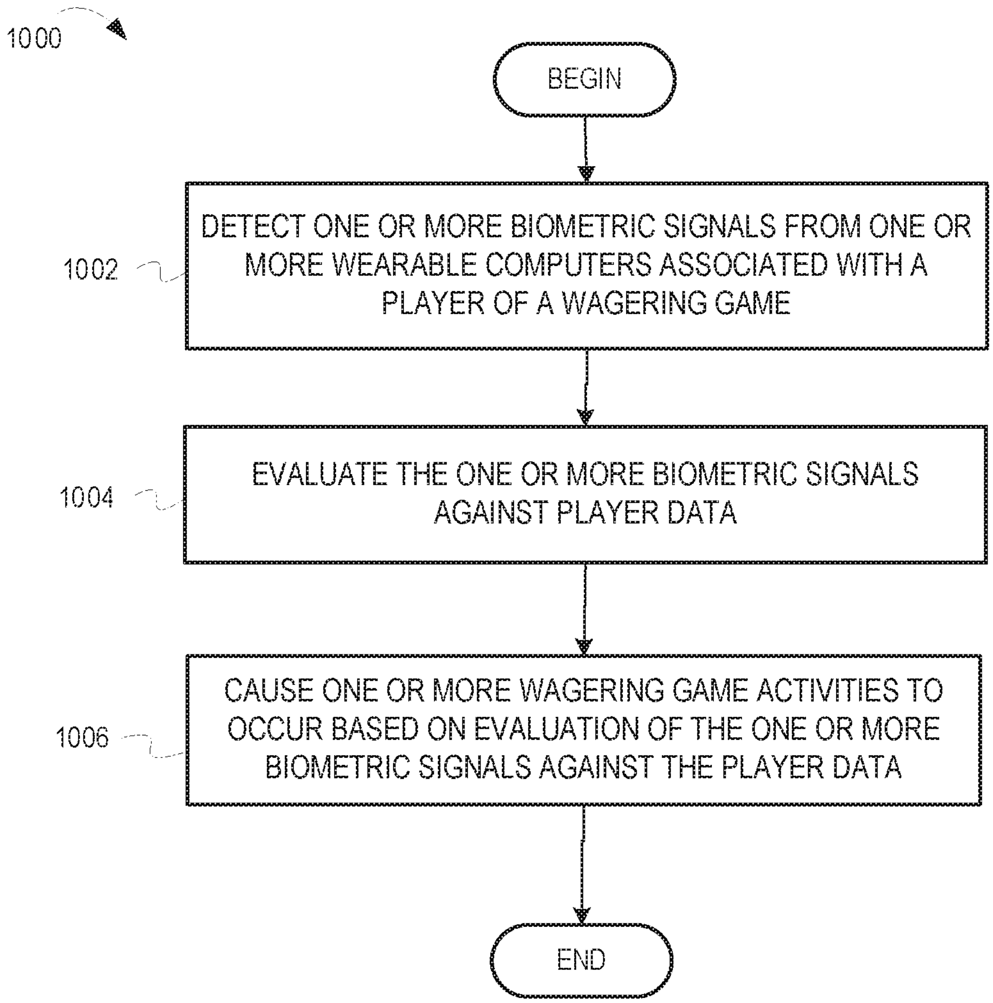
FIG. 10 is a flow diagram 1000 illustrating causing wagering game activities based on analysis of biometric signals from a wagering game wearable, according to some embodiments.

FIG. 10 is a flow diagram ("flow") 1000 illustrating causing wagering game activities based on analysis of biometric signals from a wearable computer, according to some embodiments. In FIG. 10, the flow 1000 begins at processing block 1002, where a wagering game system ("system") detects one or more biometric signal s from one or more wearable computers associated with a player of a wagering game.

The flow 1000 continues at processing block 1004, where the system evaluates the one or more biometric signals against player data. For example, the system can compare the one or more biometric signals to biometric data related to a baseline emotional state of the player. In some examples, the system can determine an emotional state of the player based on evaluation of the one or more biometric signals against the player data. In some embodiments, the presentation parameter is a luck value. The system can modify the luck value based on the emotional state of the player.

The flow 1000 continues at processing block 1006, where the system causes one or more wagering game activities to occur based on evaluation of the one or more biometric signals against the player data. In some examples, the player data comprises a history of biometric data for the player associated with the game. The system can evaluate the one or more biometric signals against the player data by comparing the history of biometric data for the player to the one or more biometric signals. The system is configured to select wagering game content to present based on the comparing. In some examples, causing the one or more wagering game activities comprises determining a type of the wagering game content to provide for presentation. In some examples, the system can detect a wagering game event and determine a type of wagering game content to select based on a type of a wearable computer. In some examples, generating the system causes the wearable computer to generate an accompanying response to the wagering game event. In some examples the system is configured to change a state of a wagering game based on biometric signals.

Figure 11:
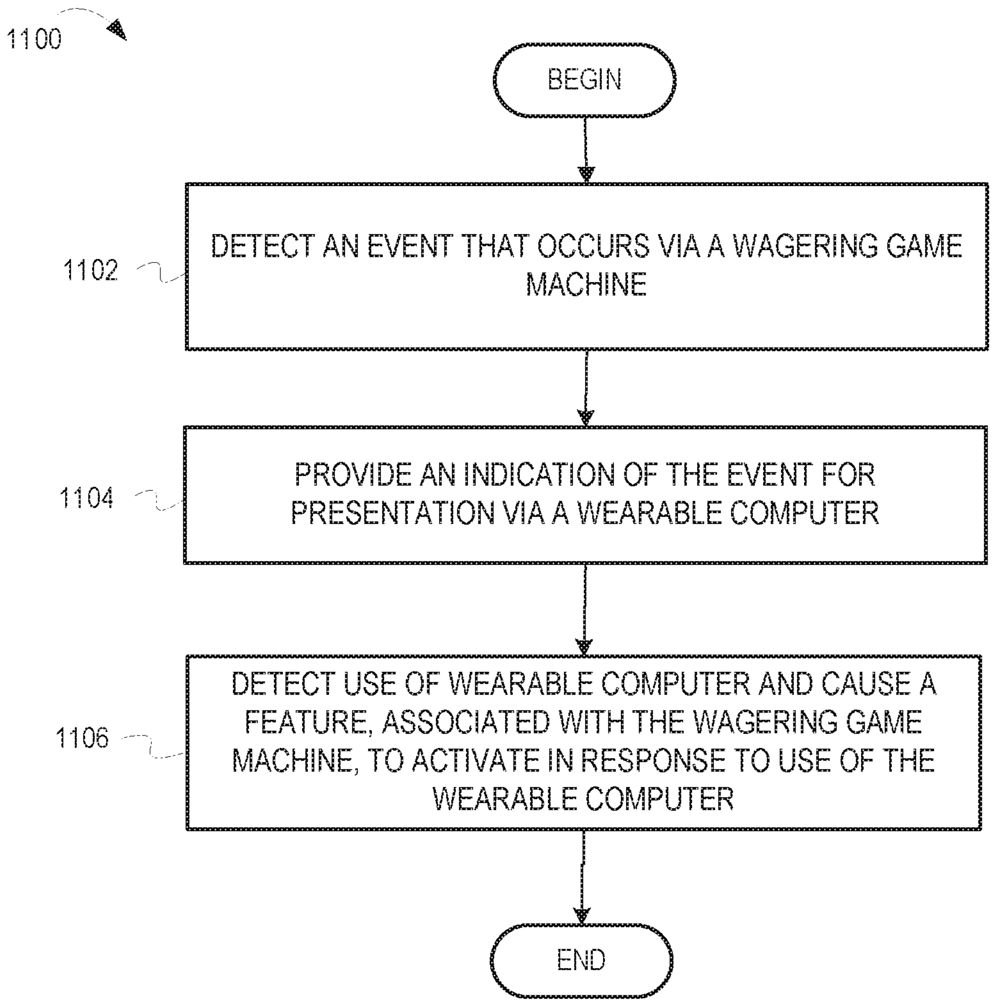
FIG. 11 is a flow diagram 1100 illustrating activating a feature of a wagering game machine via use of a wagering game wearable, according to some embodiments.

FIG. 11 is a flow diagram ("flow") 1100 illustrating activating a feature of a wagering game machine via use of a wearable computer, according to some embodiments. In FIG. 11, the flow 1100 begins at processing block 1102, where a wagering game system ("system") detects an event that occurs via a wagering game machine. The event may be any type of event that occurs during a wagering game session, such as an event that starts the gaming session (e.g., a cash-in event, a card swipe, a funds transfer, etc.), a game play event (e.g., a betting action, a spinning action, etc.), a game outcome (e.g., a win or loss), etc.

In some examples, the event indicates an error of the wagering game machine. Further, in some embodiments, the activating the feature associated with the wagering game machine comprises presenting maintenance information associated with the error via the wearable computer in response to the user input via the wearable computer. In some examples, the system can provide indicators, via the wearable computer, to a location of a wagering game machine within a casino in response to detecting the event.

The flow 1100 continues at processing block 1104, where the system provides an indication of the event for presentation via a wearable computer. In some examples, the event is a wagering game outcome. The system is configured to authorize the wearable computer to activate the feature in response to the wagering game outcome. In other examples, the event is a maintenance need of a wagering game machine. The system can provide error codes, descriptions of maintenance needs, and so forth, for presentation via the wearable.

The flow 1100 continues at processing block 1106, where the system detects a use of the wearable computer and causes a feature, associated with the wagering game machine, to activate in response to use of the wearable computer. In some embodiments, the system can cause the wagering game machine to activate a feature in response to use of the wearable. For example, in FIG. 7, message 702 indicates that if a casino employee touches the wrist wearable 733 to the wagering game machine 760, the wagering game machine 760 will provide free spins. The wagering game machine 760 can present an indicator via an output presentation device (e.g., a display device) that the five free spins had been awarded. In some examples, the wagering game machine 760 can cause a credit meter to pay for the free spins. In some examples the wagering game machine 760 can cause the free spins to occur in a bonus game. In other examples, wagering game machine can provide other features, such as additional content (e.g., new reel symbols, a bonus game, a secondary game, etc.), additional functionality (e.g., add a new game function that normally would not be available), improved functionality (e.g., offer an increase to a bet limit), etc. In some examples, the feature can be related to physical access or security features of the wagering game machine. For instance, as shown in FIG. 7, as indicated in message 704, a casino employee can touch a wrist wearable to a cabinet of the wagering game machine 760, which will cause a door to unlatch.

In other examples, the system can cause the wearable to activate a feature that is related to the wagering game machine. For example, in FIG. 7, the message 704 indicates that if the casino employee touches their wrist wearable, a manual for the wagering game machine 760 will appear via an eye wearable. In another example, the message 702 indicates that the wearable will glow.

In some embodiments, the system detects that the use of the wearable computer is related to the indication of the event. For example, the wearable can present options pertinent to the event, which a user of the wearable can respond to using the wearable. In some examples, the system activates the feature by causing the wearable to specify to a user of the wearable to perform a specific actions (e.g., to interact with the wearable, to touch the wearable computer to a wagering game machine, to activate a security feature of the wagering game machine using the wearable, etc.). The system can detect the performance of the specified action and respond accordingly.

Example Operating Environments

This section describes example operating environments, systems, networks, etc. and presents structural aspects of some embodiments.

Wagering Game System Architecture

Figure 12:
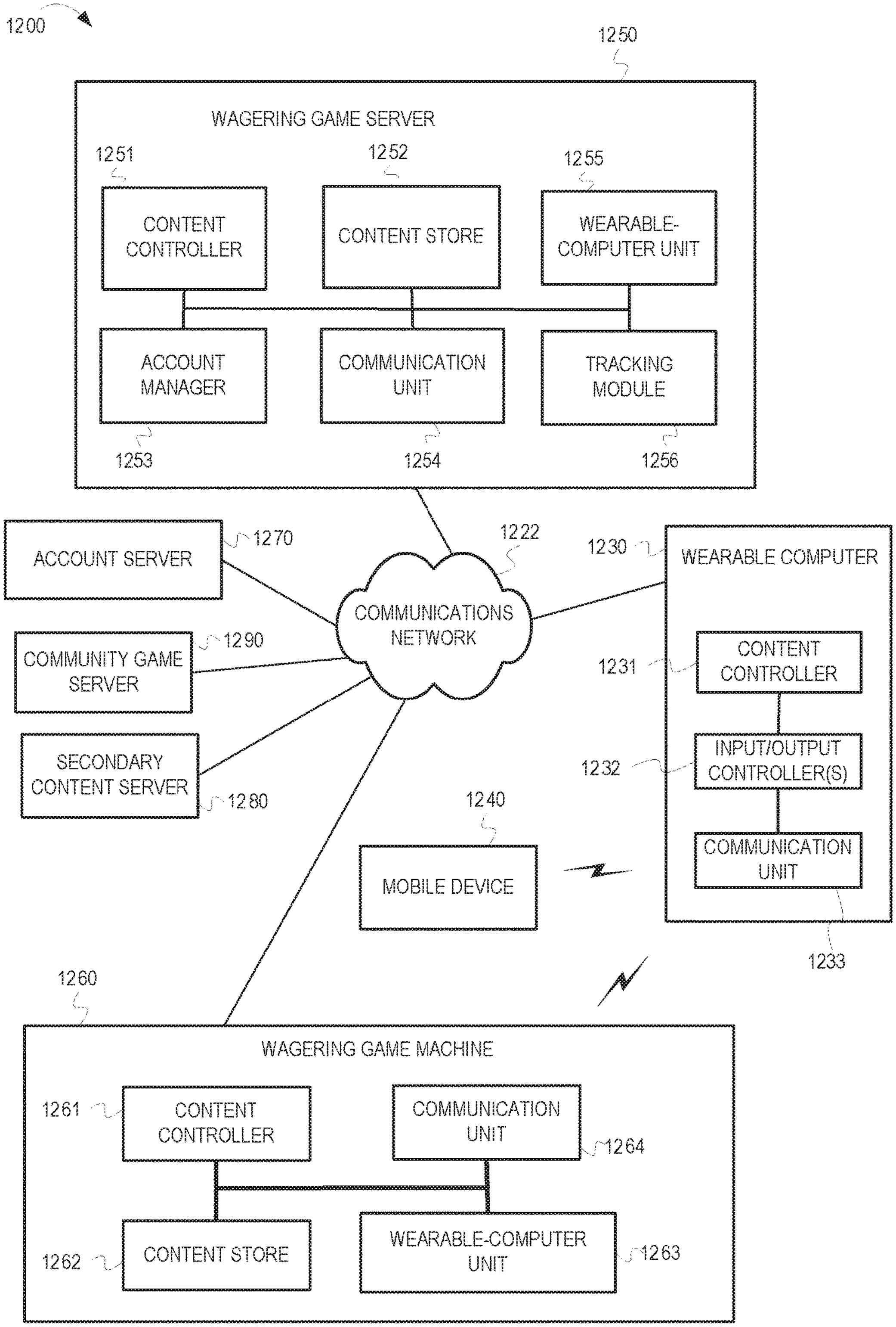
FIG. 12 is an illustration of a wagering game system architecture 1200, according to some embodiments.

FIG. 12 is a conceptual diagram that illustrates an example of a wagering game system architecture 1200, according to some embodiments. The wagering game system architecture 1200 can include an account server 1270 configured to control user related accounts accessible via wagering game networks and social networks. The account server 1270 can store wagering game player account information, such as account settings (e.g., settings related to gaming eyewear, settings related to group games, settings related to social contacts, etc.), preferences (e.g., player preferences regarding presentation of content via gaming eyewear, player preferences regarding preferred secondary content, etc.), player profile data (e.g., name, avatar, screen name, etc.), and other information for a player's account (e.g., financial information, account identification numbers, virtual assets, social contact information, etc.). The account server 1270 can contain lists of social contacts referenced by a player account. The account server 1270 can also provide auditing capabilities, according to regulatory rules. The account server 1270 can also track performance of players, machines, and servers.

The wagering game system architecture 1200 can also include a wagering game server 1250 configured to control wagering game content, provide random numbers, and communicate wagering game information, account information, and other information to and from gaming devices configured to use and/or present the content, such as a wagering game machine 1260 and/or wearable computer 1230. The wagering game server 1250 can include a content controller 1251 configured to manage and control content for the presentation of content on the gaming devices. For example, the content controller 1251 can generate game results (e.g., win/loss values), including win amounts, for games played via the gaming devices. The content controller 1251 can communicate the game results to the gaming devices. The content controller 1251 can also generate random numbers and provide them to the gaming devices so that the gaming devices can generate game results. The wagering game server 1250 can also include a content store 1252 configured to contain content to present on the gaming devices. The wagering game server 1250 can also include an account manager 1253 configured to control information related to player accounts. For example, the account manager 1253 can communicate wager amounts, game results amounts (e.g., win amounts), bonus game amounts, etc., to the account server 1270. The wagering game server 1250 can also include a communication unit 1254 configured to communicate information to the gaming devices and to communicate with other systems, devices and networks.

The wagering game server 1250 can also include a wearable-computer unit 1255 configured to generate, modify, and/or control gaming content for wagering games that use the wearable computer 1230. In some embodiments, the wearable-computer unit 1255 is configured to communicate player data, biometric data, play history and so forth with the wearable computer 1030. In some embodiments, the wearable-computer unit 1255 is incorporated into, or used in conjunction with, the content controller 1251. Further, the wagering game server 1250 includes a tracking module 1256 configured to track a position and/or orientation of the wearable computer 1230.

The wagering game system architecture 1200 can also include the wearable computer 1230. In some embodiments, the wearable computer 1230 is configured to detect game events in a wagering game, store a player history, transport wagering game event data between casino locations, provide biometric signals, respond to wagering game events and so forth. The wearable computer 1230 can include a content controller 1231 configured to process information and control functionality of the wearable computer 1230. The content controller 1231 may include a microprocessor. The wearable computer 1230 can also include input/output controller(s) 1232 configured to present images via the wearable computer 1230, produce sounds via the wearable computer 1230, generate haptic responses via the wearable computer 1230, and so forth. The wearable computer 1230 also includes a communication unit 1233 configured to communicate with a mobile device 1240, the wagering game machine 1260, the wagering game server 1250, or any other element of the wagering game system architecture 1200.

In some embodiments, the wearable computer 1230 can interface with the mobile device 1240. For instance, the wearable computer 1230 can connect to a smartphone, a tablet computer, a mobile wagering game machine, etc. An application on the mobile device 1240 can provide a user interface by which a player can select specific content to present via the wearable computer 1230 and/or select specific modes for the wearable computer 1230. In some embodiments, the mobile device 1240 provides functionality, services and resources that the wearable computer 1230 uses, such as global positioning system (GP S) services, contact and scheduling applications, processing and memory storage, etc.

The wagering game system architecture 1200 can also include the wagering game machine 1260 configured to present wagering games and other information. The wagering game machine 1260 can include a content controller 1261 configured to manage and control content and presentation of content on the wagering game machine 1260 (e.g., present content for a card game such as Poker, Blackjack, etc.). The wagering game machine 1260 can also include a content store 1262 configured to contain content to present on the wagering game machine 1260. The wagering game machine 1260 can further include a wearable-computer unit 1263 configured to interact with the wearable computer 1230, such as by providing game data, providing game content, detecting and analyzing biometric data provided by the wearable computer 1230, and so forth.

The wagering game system architecture 1200 can also include a community game server 1290 configured to provide and control content for community games, including networked games, social games, competitive games, or any other game that multiple players can participate in at the same time.

The wagering game system architecture 1200 can also include a secondary content server 1280 configured to provide content and control information for secondary games, or other secondary content, available on a wagering game network (e.g., secondary wagering game content, promotions content, advertising content, player tracking content, web content, etc.). The secondary content server 1280 can provide "secondary" content to the wearable computer 1230. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interfaces), thus becoming, or falling under the control of, primary content or primary applications, and vice versa.

Each component shown in the wagering game system architecture 1200 is shown as a separate and distinct element connected via a communications network 1222. However, some functions performed by one component could be performed by other components. Furthermore, the components shown may all be contained in one device, but some, or all, may be included in, or performed by, multiple devices, as in the configurations shown in FIG. 12 or other configurations not shown. For example, the account manager 1253 and the communication unit 1254 can be included in the wagering game machine 1260 instead of, or in addition to, being a part of the wagering game server 1250. Further, in some embodiments, the wagering game machine 1260 can determine wagering game outcomes, generate random numbers, etc. instead of, or in addition to, the wagering game server 1250.

The wagering game machines described herein (e.g., wagering game machine 1260) can take any suitable form, such as floor standing models, handheld mobile units, counter-top or bar-top models, workstation-type console models, surface computing machines, mobile telecommunication devices (e.g., smartphones, mobile telephones, personal digital assistants (PDA), etc.), personal electronic devices (e.g., portable televisions, MP3 players, entertainment devices, etc.), and so forth. Further, wagering game machines can be primarily dedicated for use in conducting wagering games, or can include non-dedicated devices (e.g., mobile phones, personal digital assistants, personal computers, etc.).

In some embodiments, wagering game machines and wagering game servers work together such that wagering game machines can be operated as thin, thick, or intermediate clients. For example, one or more elements of game play may be controlled by the wagering game machines (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machines can present a graphical representation of such outcome or asset modification to the user (e.g., player). In an alternative example, the server determines game outcomes, while the wagering game machine executes game code and processes display information to be displayed on the display(s) of the wagering game machine. In a thick-client example, the wagering game machines can execute game code, process display information, determine game outcomes, and communicate the outcomes to the wagering game server for recording or managing a player's account. Numerous alternative configurations are possible such that the aforementioned and other functions may be performed onboard or external to a wagering game machine as may be necessary for particular applications.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system architecture 1200 can be implemented as software, hardware, any combination thereof, or other forms of embodiments not listed. For example, any of the network components (e.g., the wagering game machines, servers, etc.) can include hardware and machine-readable storage media including instructions for performing the operations described herein.

Wagering Game Machine Architecture

Figure 13:
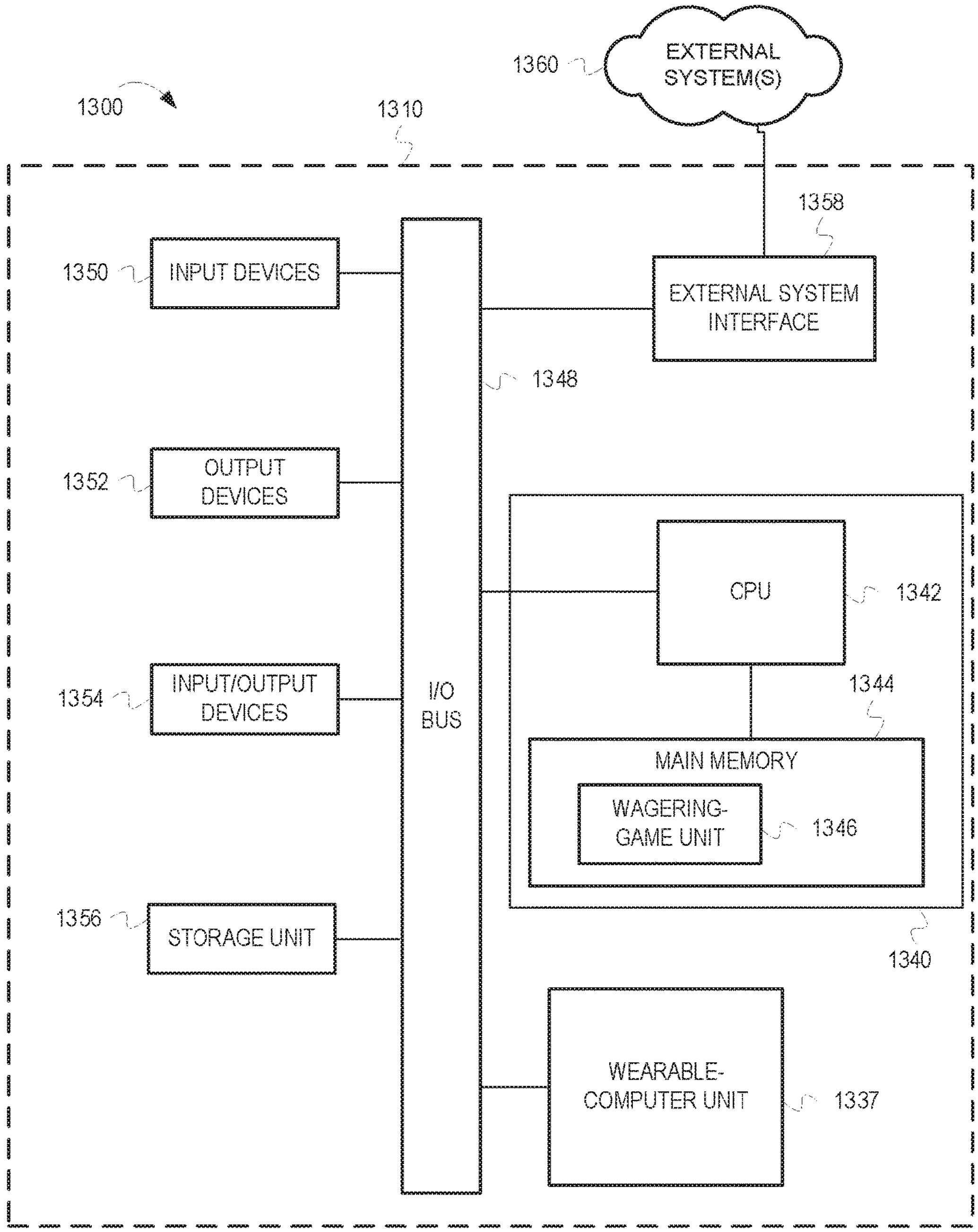
FIG. 13 is an illustration of a wagering game machine architecture 1300, according to some embodiments.

FIG. 13 is a conceptual diagram that illustrates an example of a wagering game machine architecture 1300, according to some embodiments. In FIG. 13, the wagering game machine architecture 1300 includes a wagering game machine 1310, with game-logic circuitry 1340 securely housed within a locked box inside a gaming cabinet. The game-logic circuitry 1340 includes a central processing unit (CPU) 1342 connected to a main memory 1344 that comprises one or more memory devices. The CPU 1342 includes any suitable processor(s), such as those made by Intel and AMD. By way of example, the CPU 1342 includes a plurality of microprocessors including a master processor, a slave processor, and a secondary or parallel processor. Game-logic circuitry 1340, as used herein, comprises any combination of hardware, software, or firmware disposed in or outside of the wagering game machine 1310 that is configured to communicate with or control the transfer of data between the wagering game machine 1310 and a bus, another computer, processor, device, service, or network. The game-logic circuitry 1340, and more specifically the CPU 1342, comprises one or more controllers or processors and such one or more controllers or processors need not be disposed proximal to one another and may be located in different devices or in different locations. The game-logic circuitry 1340, and more specifically the main memory 1344, comprises one or more memory devices which need not be disposed proximal to one another and may be located in different devices or in different locations. The game-logic circuitry 1340 is operable to execute all of the various gaming methods and other processes disclosed herein. The main memory 1344 includes a wagering-game unit 1346. In one embodiment, the wagering-game unit 1346 causes wagering games to be presented, such as video poker, video black jack, video slots, video lottery, etc., in whole or part.

The game-logic circuitry 1340 is also connected to an input/output (I/O) bus 1348, which can include any suitable bus technologies, such as an AGTL+ frontside bus and a PCI backside bus. The I/O bus 1348 is connected to various input devices 1350, output devices 1352, and input/output devices 1354. The I/O bus 1348 is also connected to a storage unit 1356 and an external-system interface 1358, which is connected to external system(s) 1360 (e.g., wagering-game networks).

The external system(s) 1360 include, in various aspects, a gaming network, other gaming machines or terminals, a gaming server, a remote controller, communications hardware, or a variety of other interfaced systems or components, in any combination. In yet other aspects, the external system(s) 1360 comprise a player's portable electronic device (e.g., cellular phone, electronic wallet, etc.) and the external-system interface 1358 is configured to facilitate wireless communication and data transfer between the portable electronic device and the wagering game machine 1310, such as by a near-field communication path operating via magnetic-field induction or a frequency-hopping spread spectrum RF signals (e.g., Bluetooth, etc.).

The wagering game machine 1310 optionally communicates with the external system(s) 1360 such that the wagering game machine 1310 operates as a thin, thick, or intermediate client. The game-logic circuitry 1340—whether located within ("thick client"), external to ("thin client"), or distributed both within and external to ("intermediate client") the wagering game machine 1310—is utilized to provide a wagering game on the wagering game machine 1310. In general, the main memory 1344 stores programming for a random number generator (RNG), game-outcome logic, and game assets (e.g., art, sound, etc.)—all of which obtained regulatory approval from a gaming control board or commission and are verified by a trusted authentication program in the main memory 1344 prior to game execution. The authentication program generates a live authentication code (e.g., digital signature or hash) from the memory contents and compares it to a trusted code stored in the main memory 1344. If the codes match, authentication is deemed a success and the game is permitted to execute. If, however, the codes do not match, authentication is deemed a failure that must be corrected prior to game execution. Without this predictable and repeatable authentication, the wagering game machine 1310, external system(s) 1360, or both are not allowed to perform or execute the RING programming or game-outcome logic in a regulatory-approved manner and are therefore unacceptable for commercial use.

When a wagering-game instance is executed, the CPU 1342 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 1342 when executing the game-outcome logic to determine a resultant outcome for that instance of the wagering game. The resultant outcome is then presented to a player of the wagering game machine 1310 by accessing the associated game assets, required for the resultant outcome, from the main memory 1344. The CPU 1342 causes the game assets to be presented to the player as outputs from the wagering game machine 1310 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human.

The wagering game machine 1310 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

In some embodiments, the game-logic circuitry 1340 is configured to store and execute instructions, which can perform one or more algorithms, such as those described in association with FIGS. 8, 9, 10 and 11. The algorithms can be used to perform operations to use, interact with, communicate with, and/or cooperate with wagering game wearables.

In some embodiments, the wagering game machine 1310 includes a wearable-computer unit 1337. The wearable-computer unit 1337 can process communications, commands, or other information, where the processing can, in some examples, use, interact with, communicate with, and cooperate with wagering game wearables.

Furthermore, any component of the wagering game machine 1310 can include hardware, firmware, or tangible machine-readable storage media including instructions for performing the operations described herein.

Wagering Game System

Figure 14:
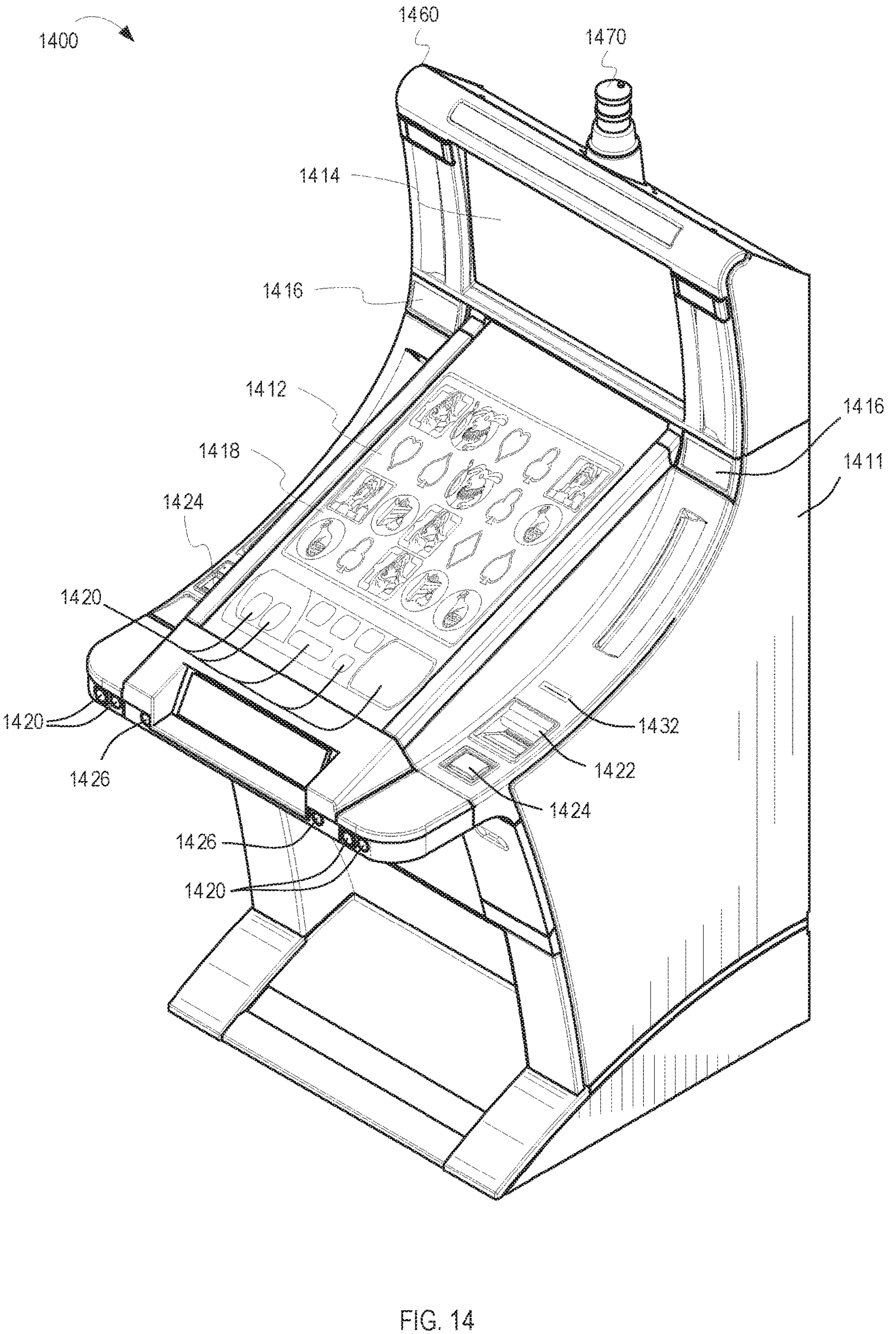
FIG. 14 is an illustration of a wagering game system 1400, according to some embodiments.

FIG. 14 is a conceptual diagram that illustrates an example of a wagering game system 1400, according to some embodiments. In FIG. 14, the wagering game system 1400 includes a wagering game machine 1460 similar to those operated in gaming establishments, such as casinos. With regard to the present inventive subject matter, wagering game machine 1460 may be any type of gaming terminal or machine and may have varying structures and methods of operation. For example, in some aspects, the wagering game machine 1460 is an electromechanical gaming terminal configured to play mechanical slots, whereas in other aspects, the wagering game machine 1460 is an electronic gaming terminal configured to play a video casino game, such as slots, keno, poker, blackjack, roulette, craps, etc. The wagering game machine 1460 may take any suitable form, such as a floor-standing model as shown, handheld mobile units, bar top models, workstation-type console models, etc. Further, the wagering game machine 1460 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The wagering game machine 1460 illustrated in FIG. 14 comprises a gaining cabinet 1411 that securely houses various input devices, output devices, input/output devices, internal electronic/electromechanical components, and wiring. The cabinet 1411 includes exterior walls, interior walls and shelves for mounting the internal components and managing the wiring, and one or more front doors that are locked and require a physical or electronic key to gain access to the interior compartment of the cabinet 1411 behind the locked door. In some examples, the cabinet 1411 forms an alcove configured to store one or more beverages or personal items of a player. A notification mechanism 1470, such as a candle or tower light, is mounted to the top of the cabinet 1411. It flashes to alert an attendant that change is needed, a hand pay is requested, or there is a potential problem with the wagering game machine 1460.

The input devices, output devices, and input/output devices are disposed on, and securely coupled to, the cabinet 1411. By way of example, the output devices include a primary display 1412, a secondary display 1414, and one or more audio speakers 1416. The primary display 1412 or the secondary display 1414 may be a mechanical-reel display device, a video display device, or a combination thereof, in which a transmissive video display is disposed in front of a mechanical-reel display to portray a video image superimposed upon the mechanical-reel display. In FIG. 14, the wagering game machine 1460 is a "slant-top" version in which the primary display 1412 is slanted (e.g., at about a thirty-degree angle toward the player of the wagering game machine 1460). Another example of wagering game machine 1460 is an "upright" version in which the primary display 1412 is oriented vertically relative to the player. The displays may variously display information associated with wagering games, non-wagering games, community games, progressives, advertisements, services, premium entertainment, text messaging, emails, alerts, announcements, broadcast information, subscription information, etc. appropriate to the particular mode(s) of operation of the wagering game machine 1460. The wagering game machine 1460 includes a touch screen(s) 1418 mounted over the primary display 1412 and/or the secondary display 1214, buttons 1420 on a button panel, bill/ticket acceptor 1422, a card reader/writer 1424, a ticket dispenser 1432 and player-accessible port(s) 1426 (e.g., audio output jack for headphones, video headset jack, USB port, wireless transmitter/receiver, etc.). It should be understood that numerous other peripheral devices and other elements exist and are readily utilizable in any number of combinations to create various forms of a wagering game machine in accord with the present concepts.

The player input devices, such as the touch screen 1418, buttons 1420, a mouse, a joystick, a gesture-sensing device, a voice-recognition device, and a virtual input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The wagering game machine 1460 includes one or more value input/payment devices and value output/payout devices. The value input devices are used to deposit cash or credits onto the wagering game machine 1460. The cash or credits are used to fund wagers placed on the wagering game played via the wagering game machine 1460. Examples of value input devices include, but are not limited to, a coin acceptor, the bill/ticket acceptor 1422, the card reader/writer 1424, a wireless communication interface for reading cash or credit data from a nearby mobile device, and a network interface for withdrawing cash or credits from a remote account via an electronic funds transfer. The value output devices are used to dispense cash or credits from the wagering game machine 1460. The credits may be exchanged for cash at, for example, a cashier or redemption station. Examples of value output devices include, but are not limited to, a coin hopper for dispensing coins or tokens, a bill dispenser, the card reader/writer 1424, the ticket dispenser 1432 for printing tickets redeemable for cash or credits, a wireless communication interface for transmitting cash or credit data to a nearby mobile device, and a network interface for depositing cash or credits to a remote account via an electronic funds transfer.

The primary display 1412 or the secondary display 1414 are configured to present wagering game content, such as a plurality of simulated symbol-bearing reels, a plurality of mechanical reels, and/or other video or mechanical presentation consistent with a game format and theme. The wagering game content may also include one or more game-session credit meters and various touch screen buttons adapted to be actuated by a player. A player can operate or interact with the wagering game using the touch screen buttons or other input devices. Game-logic circuitry operates to execute a wagering-game program causing the primary display 1412 or the secondary display 1414 to display the wagering game.

In response to receiving an input indicative of a wager, the reels are rotated and stopped to place symbols on the reels in visual association with paylines such as paylines. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the wagering game machine 1460, following receipt of an input from the player to initiate a wagering-game instance. The wagering game machine 1460 then communicates the wagering-game outcome to the player via one or more output devices (e.g., primary display 1412 or secondary display 1414) through the display of information such as, but not limited to, text, graphics, static images, moving images, etc., or any combination thereof. In accord with the method of conducting the wagering game, the game-logic circuitry transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry is configured to process the electronic data signal, to interpret the data signal (e.g., data signals corresponding to a wager input), and to cause further actions associated with the interpretation of the signal in accord with stored instructions relating to such further actions executed by the controller. As one example, a central processing unit (CPU) causes the recording of a digital representation of the wager in one or more storage media (e.g., a storage unit), the CPU, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU (e.g., the wager in the present example). As another example, the CPU further, in accord with the execution of the stored instructions relating to the wagering game, causes the primary display 1412, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry to determine the outcome of the wagering-game instance. In at least some aspects, the game-logic circuitry is configured to determine an outcome of the wagering-game instance at least partially in response to the random parameter.

In one embodiment, the wagering game machine 1460 and, additionally or alternatively, an external system (e.g., a gaming server), means gaming equipment that meets the hardware and software requirements for security and predictability as established by at least one state's gaming control board or commission. Prior to commercial deployment, the wagering game machine 1460, the external system, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product that may include a computer-readable storage medium having stored thereon instructions, which may be used to program a computer system to perform a process according to embodiments(s), whether presently described or not, because every conceivable variation is not enumerated herein. A computer-readable storage medium includes any mechanism that stores information in a form (e.g., software, processing application) readable by a machine (e.g., a computer). For example, computer-readable storage media includes magnetic storage medium (e.g., floppy diskette), read only memory (ROM), random access memory (RAM), magnetic disk storage media, optical storage media (e.g., CD-ROM), magneto-optical storage media, flash memory, erasable programmable memory (e.g., EPROM and EEPROM), or other types of media suitable for storing electronic instructions. In addition, embodiments may be embodied in a machine-readable signal media, such as any media suitable for transmitting software over a network.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A gaming system configured to present a casino wagering game, the gaming system comprising:
- one or more communication interfaces configured for wireless communication; and
- game-logic circuitry configured to:
  - detect, via at least one of the one or more communication interfaces, one or more wearable computers proximal to the gaining system;
  - identify each of the one or more wearable computers as being a first-type wearable computer or a second-type wearable computer;
  - in response to identifying a first-type among the one or more detected wearable computers, provide a first feature associated with the gaming system; and
  - in response to identifying a second-type among the one or more detected wearable computers, provide a second feature associated with the gaming system, the second feature being different from the first feature.

2. The gaming system of claim 1, wherein at least one of the first or second features is a gaming feature associated with the casino wagering game.

3. The gaming system of claim 1, wherein at least one of the first or second features is a non-gaming feature presented by the gaming system.

4. The gaming system of claim 1, wherein the game-logic circuitry identifies a first-type and a second-type among the one or more wearable computers.

5. The gaming system of claim 4, wherein the first-type and the second-type are worn by a single player.

6. The gaming system of claim 1, wherein the game-logic circuitry detects a plurality of wearable computers proximal to the gaming system and simultaneously associates the plurality with a play of the casino wagering game.

7. The gaming system of claim 4, wherein the first-type is an eye wearable computer and the second-type is a wrist wearable computer.

8. The gaming system of claim 1, wherein the first feature is first game content associated with a game event in the casino wagering game and the second feature is second game content associated with the game event, wherein the second game content is different from the first game content.

9. The gaming system of claim 1, wherein at least one of the one or more wearable computers interacts with the gaming system via a mobile phone.

10. The gaming system of claim 1, wherein providing the first feature includes sending a first signal to the first-type but not to the second-type.

11. A method of operating a gaming system including game-logic circuitry and one or more communication interfaces configured for wireless communications, the method comprising:

detecting, via one of the one or more communication interfaces, one or more wearable computers proximal to the gaming system;

identifying, via the game-logic circuitry, each of the one or more wearable computers as being a first-type or a second-type;

in response to identifying a first-type among the one or more detected wearable computers, providing a first feature associated with the gaming system; and in response to identifying a second-type among the one or more detected wearable computers, providing a second feature associated with the gaming system, the second feature being different from the first feature.

12. The method of claim 11, wherein providing the first feature includes enabling two-way communication between the gaming system and the first-type via at least one of the one or more communication interfaces.

13. The method of claim 11, wherein providing the first feature includes pairing the first-type with the gaming system via at least one of the one or more communication interfaces.

14. The method of claim 11, wherein providing the first feature includes enabling a first game feature of the casino wagering game.

15. The method of claim 11, further comprising, in response to identifying a predetermined combination of first-type and second-type wearable computers among the one or more detected wearable computers, unlocking a previously locked or hidden game feature.

16. A gaming system configured to present a casino wagering game, the gaming system comprising:

one or more communication interfaces configured for wireless communication; and game-logic circuitry configured to:

detect, via one of the one or more communication interfaces, one or more wearable computers within a proximity range of the gaming system;

identify one or more characteristics of the one or more wearable computers;

determine, based on the one or more characteristics, whether each of the one or more wearable computers is a first-type or a second-type;

in response to determining that a first-type is within the proximity range, enable a first game feature of the casino wagering game; and in response to determining that a second-type is within the proximity range, enable a second game feature of the casino wagering game, the second game feature being different from the first game feature.

17. The gaming system of claim 16, wherein the first game feature is enabled for the first-type only.

18. The gaming system of claim 16, wherein the first-type and the second-type are worn by a first player and a second player, respectively.

19. The gaming system of claim 16, wherein the first game feature is associated with a first participant in a community bonus game, and wherein the second game feature is associated with a second participant in the community bonus game.

20. The gaming system of claim 16, wherein the first-type and the second-type are selected from a group including an ear wearable, an eye wearable, a wrist wearable, a jewelry wearable, a clothing wearable, and a watch wearable.

* * * * *